United States Patent
Reddy et al.

(10) Patent No.: US 10,871,699 B2
(45) Date of Patent: Dec. 22, 2020

(54) TEMPORAL MODES OF ELECTROMAGNETIC RADIATION USING NONLINEAR OPTICAL CAVITIES AND SHAPED LASER PULSES

(71) Applicant: University of Oregon, Eugene, OR (US)

(72) Inventors: Dileep V. Reddy, Eugene, OR (US); Michael G. Raymer, Eugene, OR (US)

(73) Assignee: University of Oregon, Eugene, OR (US)

( * ) Notice: Subject to any disclaimer, the term of this patent is extended or adjusted under 35 U.S.C. 154(b) by 0 days.

(21) Appl. No.: 16/530,737

(22) Filed: Aug. 2, 2019

(65) Prior Publication Data
US 2020/0041868 A1    Feb. 6, 2020

Related U.S. Application Data

(60) Provisional application No. 62/713,811, filed on Aug. 2, 2018.

(51) Int. Cl.
*G02F 1/35* (2006.01)
(52) U.S. Cl.
CPC ......... *G02F 1/3544* (2013.01); *G02F 1/3534* (2013.01); *G02F 1/3536* (2013.01)
(58) Field of Classification Search
None
See application file for complete search history.

(56) References Cited

U.S. PATENT DOCUMENTS

| | | | |
|---|---|---|---|
| 7,386,018 B2 * | 6/2008 | Mori | H01S 3/06754 372/18 |
| 7,529,481 B1 | 5/2009 | Doerr et al. | |
| 10,175,556 B2 * | 1/2019 | Reimer | G02F 1/365 |
| 10,649,307 B2 * | 5/2020 | Vernon | G02F 1/3556 |
| 2020/0041868 A1 * | 2/2020 | Reddy | G02F 1/3544 |

FOREIGN PATENT DOCUMENTS

WO    WO 2019/116019    6/2019

OTHER PUBLICATIONS

G. Raymer, D. V. Reddy, L. Mejling and K. Rottwitt, "Quantum frequency conversion of single-photon states by three and four-wave mixing," CLEO: 2013, San Jose, CA, 2013, pp. 1-2. (Year: 2013).*

(Continued)

*Primary Examiner* — Rhonda S Peace
(74) *Attorney, Agent, or Firm* — Klarquist Sparkman, LLP

(57) ABSTRACT

Apparatus include an optical cavity including an optical coupling portion situated to couple an optical signal input field to an intracavity optical signal field and an optical control input field to an intracavity optical control field, wherein the optical cavity includes a nonlinear optical medium that mediates a selective exchange of at least one predetermined temporal mode between the intracavity optical signal field and an intracavity optical register field based on a nonlinear phase-matched interaction between the intracavity optical signal, control, and register fields and selectable field characteristics of the optical control input field.

21 Claims, 11 Drawing Sheets

(56) References Cited

OTHER PUBLICATIONS

L. Mejling, D. V. Reddy, C. J. McKinstrie, M. G. Raymer and K. Rottwitt, "Mode selectivity with quantum-state-preserving frequency conversion using four-wave mixing," 2013 IEEE Photonics Society Summer Topical Meeting Series, Waikoloa, HI, 2013, pp. 177-178. (Year: 2013).*

Cirac, et al., "Quantum optical implementation of quantum information processing," *Institute for Theoretical Physics, University of Innsbruck*, 43 pages (Oct. 17, 2001).

Lu et al., "Chip-integrated visible-telecom photon pair sources for quantum communication," *Center for Nanoscale Science Technology, National Institute of Standards and Technology, et al.*, 13 pages (May 11, 2018).

Nunn et al., "Theory of noise suppression in A-type quantum memories by means of a cavity," *Physical Review A*, 96:012338-01-012338-12 (Jul. 31, 2017).

Reddy et al., "Photonic temporal-mode multiplexing by quantum frequency conversion in a dichroic-finesse cavity," *Oregon Center for Optical, Molecular, and Quantum Science, and Department of Physics*, 10 pages (Aug. 8, 2017).

Reddy et al., "Temporal-mode-selective optical Ramsey interferometry via cascaded frequency conversion," *Oregon Center for Optical, Molecular, and Quantum Science, and Department of Physics*, 6 pages (Oct. 18, 2017).

Collett et al., "Squeezing of intracavity and traveling-wave light fields produced in parametric amplification," *Physical Review A*, 30(3):1386-1391 (Sep. 1984).

\* cited by examiner

TEMPORAL MODES OF ELECTROMAGNETIC RADIATION USING NONLINEAR OPTICAL CAVITIES AND SHAPED LASER PULSES

CROSS REFERENCE TO RELATED APPLICATION

This application claims the benefit of U.S. Provisional Application No. 62/713,811, filed Aug. 2, 2018, which is hereby incorporated by reference in its entirety.

ACKNOWLEDGMENT OF GOVERNMENT SUPPORT

This invention was made with government support under Grant No. 1521466, QIS—Quantum Information Science Program (2015-2018), awarded by the National Science Foundation. The government has certain rights in the invention.

FIELD

The field is nonlinear optical cavities and laser pulse shaping.

BACKGROUND

A quantum pulse gate can be understood as a device that can unitarily and deterministically operate on a single temporal mode (TM) component of an arbitrary, pulsed optical input, while simultaneously ensuring zero cross-talk or contamination from any orthogonal TMs of the optical input. However, practical examples of such devices do not exist, as the only known implementation of a QPG, i.e. temporal mode interferometry, as disclosed in D. V. Reddy & M. G. Raymer, arXiv:1710.06736 (2017), and references therein, are limited by substantial footprints. Accordingly, a need remains for a quantum pulse gate without such limitations.

SUMMARY

Aspects of the disclosed technology are directed to selective temporal mode conversion using nonlinear optical cavities, and examples herein can satisfy the aforementioned need by providing devices with small footprints and that do not rely on group velocity dispersion in temporal mode selective media.

According to aspect of the disclosed technology, apparatus include an optical cavity including an optical coupling portion situated to couple an optical signal input field to an intracavity optical signal field and an optical control input field to an intracavity optical control field, wherein the optical cavity includes a nonlinear optical medium that mediates a selective exchange of a predetermined temporal mode of the optical signal input field and an intracavity optical register field based on a nonlinear phase-matched interaction between the intracavity optical signal, control, and register fields and selectable field characteristics of the optical control input field. In representative examples, a cavity lifetime of the intracavity optical register field is longer than a cavity lifetime of the intracavity optical signal field, and a rate of temporal variation of the optical signal input field is slower than the cavity lifetime of the intracavity optical signal field. In selected examples, the cavity lifetime of the intracavity optical register field is at least ten times longer than a cavity lifetime of the intracavity optical signal field. In some embodiments, the field characteristics of the optical control input field are selected to produce the selective exchange corresponding to a unitary shift of the predetermined temporal mode of the optical signal input field to a carrier frequency of the intracavity optical register field so that the intracavity optical register field can be stored in the optical cavity or allowed to leak out of the optical cavity. In representative examples, the field characteristics of the optical control input field are selected to produce the selective exchange corresponding to a unitary shift of the intracavity optical register field to the predetermined temporal mode at a carrier frequency of an optical signal output field that can be read out of the optical cavity. Some embodiments further include a pulse controller configured to produce the optical control input field with the selectable field characteristics. Particular examples can include an input optical waveguide optically coupled to the optical cavity through the optical coupling portion and configured to propagate one or both of the optical signal input field and optical control input field, and also include an output optical waveguide optically coupled to the optical cavity through the optical coupling portion and configured to propagate one or more of an optical signal output field, an optical control output field, and an optical register output field. In some examples, the input optical waveguide and the output optical waveguide form a single continuous waveguide. In further examples, the input optical waveguide is evanescently coupled to the optical cavity through the optical coupling portion to couple the one or both of the of the optical signal input field and optical control input field to the respective intracavity optical signal field and/or intracavity optical control field of the optical cavity, and the output optical waveguide is evanescently coupled to the optical cavity through the optical coupling portion to couple one or more of the intracavity optical signal, control, and register fields out of the optical cavity. Some embodiments can include a signal input optical waveguide configured to propagate the optical signal input field and optically coupled to the optical cavity through a first surface of the optical coupling portion, and also include a control input optical waveguide configured to propagate the optical control input field and optically coupled to the optical cavity through a second surface of the optical coupling portion spaced apart from the first surface. In particular examples, the optical coupling portion includes one or more dichroic reflective surfaces configured to optically couple the optical signal input field and optical control input field to the optical cavity. In some examples, the one or more dichroic surfaces or another dichroic surface provides a cavity lifetime of the intracavity optical register field that is at least two orders of magnitude longer than a cavity lifetime of the intracavity optical signal field. In some embodiments, the mediated selective exchange corresponds to one of a second-order optical nonlinearity and a third-order optical nonlinearity. In selected examples, the optical cavity includes a ring resonator. In other examples, the optical cavity includes a plurality of planar mirrors. In some examples, the optical cavity includes a pair of opposing reflective elements configured to form a Fabry-Perot resonator. In some embodiments, the optical cavity corresponds to a first optical cavity and the optical signal input field corresponds to a qudit, and the embodiments also include a second optical cavity situated to receive the qudit as operated on by the first optical cavity and to target a predetermined temporal mode of the operated-on qudit with a second optical control input field coupled to the second optical cavity. Some embodiments can include a detector optically coupled to the optical cavity to detect the optical signal, control, or register fields, or a combination thereof. Representative examples can correspond to quantum pulse gates.

According to another aspect of the disclosed technology, methods include frequency shifting with a non-linear optical cavity a selected temporal mode component of a first field at a first frequency to a second field at a second frequency based on a time-dependence of a third field at a third frequency, wherein a cavity lifetime of the second field is longer than a cavity lifetime of the first field, and a rate of temporal variation of a first signal input associated with the first field is slower than the cavity lifetime of the first field.

According to a further aspect of the disclosed technology, apparatus include means for receiving a first optical field in an optical cavity, and means for selectively converting a predetermined temporal mode component of the first optical field to a second optical field at a disjoint frequency in the optical cavity.

The foregoing and other objects, features, and advantages of the disclosed technology will become more apparent from the following detailed description, which proceeds with reference to the accompanying figures.

DETAILED DESCRIPTION

Figure 1:
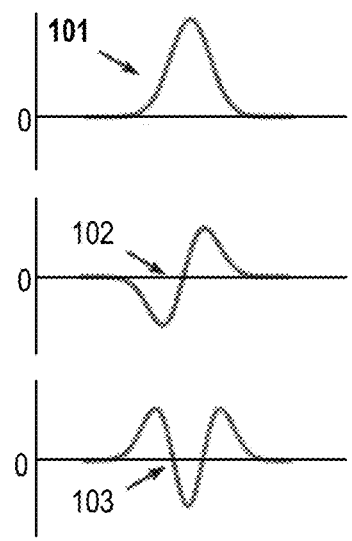
FIG. 1 are example temporal mode (TM) basis functions according to amplitude vs. time.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

The article entitled "Photonic temporal-mode multiplexing by quantum frequency conversion in a dichroic-finesse cavity," by Dileep Reddy and Michael G. Raymer (arXiv: 1708.01705v2 [quant-ph] 8 Aug. 2017), is incorporated by reference herein and referred to hereinafter as the "Reddy article."

Temporal-mode multiplexing can be understood as a natural generalization of time-division multiplexing and frequency-division multiplexing, in that temporal-mode (TM) multiplexing automatically encompasses the use of states that are complex linear superpositions of disjoint time/frequency bins. Quantum pulse gate devices preferably unitarily and deterministically address/operate on a single TM component of an arbitrary pulsed optical input while simultaneously ensuring zero crosstalk or contamination from any orthogonal TMs. Thus, operational quantum pulse gates are the chief enabling technology for full exploitation of TMs for quantum information science (QIS), including quantum computing. While an interferometric multipass technique called temporal-mode interferometry (e.g., "Temporal-mode-selective optical Ramsey interferometry via cascaded frequency conversion" by D. V. Reddy & M. G. Raymer, arXiv:1710.06736 (2017)) can satisfy the TM selectivity conditions for quantum pulse gates, such an approach relies on interband pulse walkoff due to material dispersion. This reliance imposes a lower limit on the physical size of any implementation of the device using available materials. In various examples herein, quantum pulse gates, apparatus, and methods disclose TM selectivity with microcavities, including implementation in micro- and nanophotonics architectures. The reduced size of such structures can allow for practical, large-scale integrability, particularly in relation to practical temporal scales. With temporal-mode interferometry devices, size generally scales linearly with temporal width. For example, for 500 fs (FWHM) pulses, waveguide lengths are typically 5 mm or longer for each TMI stage, in order to provide complete pulse walkoff. For 5 ps (FWHM) pulses, waveguide length typically increases to 50 mm or longer. However, waveguide lengths of 50 mm are generally difficult to make sufficiently uniform and defect-free, which can impact device efficiency. On the other hand, cavity-based examples herein can be used for a wide range of temporal widths, with a range upper limit typically determined by the cavity lifetime of a longer-duration mode C(t) (discussed further hereinbelow), with the cavity lifetime determined by the extent of the quality factor (Q) that can be achieved for the cavity. In various described cavity examples, practical parameters values demonstrate operation for pulse widths of 100s of picoseconds (FWHM). Ultra-short temporal widths are generally difficult to employ in optical fiber systems as the pulses suffer dispersion as they propagate through extended lengths of solid media. Smaller devices where TMI devices would require ultra-short pulse widths, are also easier to manufacture to uniform specifications, allowing devices that use cavity approaches described herein to be more practical to manufacture, to implement in extended or complex structures, and to operate and use with connected devices and structures.

Examples herein can selectively and unitarily shift the carrier frequency of (and thereby spatially/temporally separate) any desired temporal-mode component ("target mode(s)") of a traveling-wave electromagnetic pulse using all-optical nonlinear wave mixing in a microcavity system and, therefore, can enable new methods of multiplexing and demultiplexing optical signals. In particular applications, disclosed techniques can be used in optical and near-infrared integrated photonics platforms where guided geometries typically limit the exploitation of polarization or transverse spatial modes as spaces for information storage/retrieval/manipulation. Examples can exhibit unitarily properties (i.e., a property of quantum systems that ensures that outcome probabilities sum to 1), implying both multiplexing and de-multiplexing capabilities, and enabling deployment in both classical and quantum regimes and technologies.

In various examples herein, temporal modes (e.g., temporally orthogonal electromagnetic wave packets) are highly selectively demultiplexed by varying in time a coupling from an external traveling-wave field to a resonant mode of a separate optical frequency in an interior of an optical cavity (also referred to as intracavity modes), by nonlinear optical frequency conversion driven by a coherent laser pulse having a time-varying amplitude. A theoretical proof that in a nonlinear optical cavity, the amplitude of the laser pulse can couple two cavity modes at different frequencies having drastically different cavity lifetimes, and that the coupling is highly temporal-mode selective, can be found in the Reddy article and is referenced hereinbelow.

In representative examples, the temporal-mode (TM) structure of pulses of guided, electromagnetic, visible or near-infrared radiation are manipulated. Traveling-wave pulses of light that are guided in a beam-like spatial mode (such as through a bulk medium, engineered wave guiding nanostructures, etc.), spectrally centered at visible or near-IR carrier frequencies, can be characterized with a earn envelope function describing a temporal variation of their electric/magnetic field amplitudes. The temporal modes of pulses can generally be represented by complex-valued scalar functions of a single variable (time-of-arrival at a fixed location, or longitudinal location along the beam-propagation direction at a fixed time). Because a set of functions forms a vector space, any arbitrary pulsed-mode envelope function can be decomposed into a linear combination of an associated set of mutually orthogonal basis functions chosen by a user. FIG. 1 shows graphs of three example mutually orthogonal functions 101, 102, 103 that can form one example choice for the basis functions of a pulse. It will be appreciated that the mutually orthogonal functions 101, 102, 103 are merely examples used for convenience of illustration and that other orthogonal functions can be used.

Figure 2:
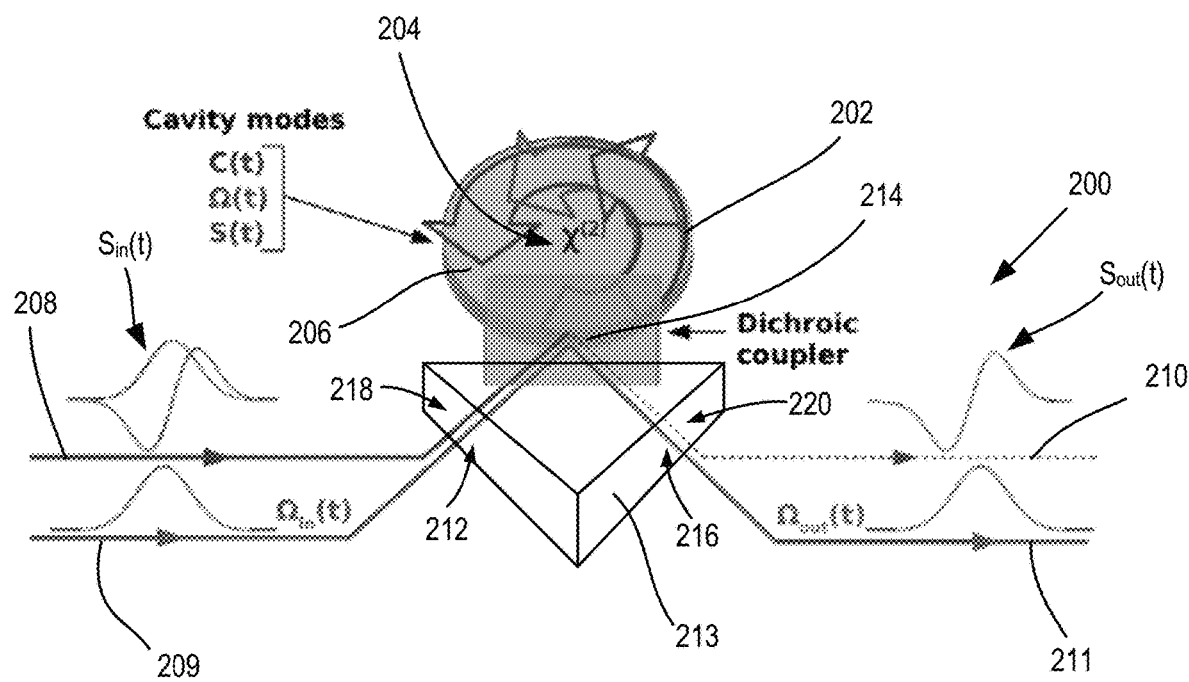
FIG. 2 is a schematic of a representative example device for TM conversion.

FIG. 2 is an example optical multiplexer 200 that includes a nonlinear optical cavity 202, typically in the form of a microcavity. Nonlinear optical media can include various materials, such as lithium niobate, PPLN, KTP, KDP, BBO, etc., for second order nonlinearity, and such as silica, silicon nitride, etc., for third-order nonlinearity. The optical cavity 202 includes a physical volume 204 that can support repeatedly circulating or oscillating electromagnetic waves at specific resonant frequencies (determined by interferometric boundary conditions) a spatially confined region of the volume 204. The optical cavity 202 can be constructed in various ways, such as through the use of discrete reflecting elements (such as mirrors or photonic-crystal Bragg reflectors), by continuously bending an index contrast profile so as to yield a circularly looping waveguide, such as in droplets, microrings, microdisks, or microtoroids, or in other ways. Various examples are described with the term "cavity," which can be used interchangeably with "resonator." Herein, cavities can also be referred to as "microcavities" or "microresonators," which typically correspond to cavities having characteristic dimensions in the range of cm, mm, or μm for supported radiation with associated wavelengths of about 10 μm or shorter. In representative examples, the physical volume 204 includes a nonlinear medium 206 situated to allow electromagnetic fields within the cavity to traverse through the nonlinear medium and participate in wave mixing. In typical examples, the material of the nonlinear medium 206 includes a second-order nonlinearity, or a third-order nonlinearity, corresponding to three-wave mixing and four-wave mixing, respectively. By way of example, second order nonlinearities can be produced in specially grown single-crystal materials with selected spatial-symmetry properties. Third order nonlinearities are typically present in all materials, though the second order nonlinearity in crystals grown for that purpose typically exhibit a substantially stronger second order effect than third order effect. A particular example of a three-wave interaction is sum-frequency generation, where the frequencies are related by $\omega_S + \omega_\Omega = \omega_C$.

During resonant operation, three resonant intracavity mode fields (or mode amplitudes) S(t), Ω(t), and C(t) can simultaneously propagate in the optical cavity 202 with respective time-dependent amplitudes and disjoint frequency spectra. The field S(t) corresponds to a resonant signal field, the field Ω(t) corresponds to a control field, and the field C(t) corresponds to a register field. The optical cavity 202 cavity has a geometry such that the nonlinear-wave mixing interaction between the three intracavity, fields S(t), Ω(t), C(t) is phase-matched. In typical examples, the signal field S(t) and the register field C(t) field can be weak in amplitude (for example, single photons), and the control field is a strong-amplitude coherent field (e.g., derived from lasers) that can mediate an exchange of amplitude between the signal field S(t) and the register field C(t). Thus, the signal field S(t) and the register field C(t) correspond to the resonant cavity mode amplitudes of the two frequency bands that will interact via the optical nonlinearity of the medium, which typically uniformly fills the cavity. The control field Ω(t) can be composed of a single central frequency in three-wave mixing examples, or two distinct central frequencies, in four-wave mixing examples.

In representative examples, the intracavity resonant signal field S(t) and control field Ω(t) are coupled to traveling field modes guided in waveguides 208-211 physically adjacent to the optical cavity 202. The coupling of the waveguides 208-211 to the optical cavity 202 allows for a pulsed signal-input temporal mode $S_{IN}(t)$, e.g., incident on a multiplexer input face 212 (e.g., with a prism 213) from the waveguide 208, to be coupled to signal field S(t) of the optical cavity 202 through a coupling interface 214 (e.g., a dichroic coupling surface having a predetermined reflectivity for selected wavelengths), and for signal field S(t) of the optical cavity 202 to be coupled out of the optical cavity 202 to signal output temporal mode $S_{OUT}(t)$, e.g., through the coupling interface 214 and emanating from a multiplexer output face 216 to become coupled into the waveguide 209. Herein, a dichroic surface includes a predetermined frequency-dependent reflectivity, including for two wavelengths, three wavelengths, four wavelengths, or more. Similarly for the control fields, the pulsed control-input temporal mode $\Omega_{IN}(t)$, incident on a multiplexer input face 218 from the waveguide 210 is coupled to Ω(t) through the coupling interface 214, and Ω(t) can be coupled to control-output temporal mode $\Omega_{OUT}(t)$ through the coupling interface 214 and emanating from a multiplexer output face 220 to become coupled into the waveguide 211. In some examples, the register field C(t) can also be coupled to guided traveling-wave modes of one or both of the waveguides 209, 211 at its own frequency. In particular examples, the register field C(t) is not coupled to any guided traveling-wave modes. For example, pulse shaping or filtering devices can selectively shape temporal mode content of input signal pulses by frequency shifting selected temporal modes to the register modes of one or more optical cavities.

It will be appreciated that various coupling mechanisms and waveguide configurations are possible, including a single waveguide corresponding to the waveguides 208, 209, a single waveguide corresponding to the waveguides 210, 211, or a single waveguide corresponding to the waveguides 208-211, that is evanescently coupled to the optical cavity 202 along the coupling interface 214. Dichroic coupling can also be used or a combination of evanescent and dichroic coupling. A coupling coefficient associated with the evanescent coupling can be selected based on various configurable coupling parameters, such as a length or area of the coupling interface 214, adjacent distances between the waveguides 208, 210 and the optical cavity 202, and refractive indexes and index differences between the optical cavity 202, waveguides 208, 210, and any material situated at the coupling interface 214 between the optical cavity 202 and the waveguides 208, 210. Optical coupling examples can include but are not limited to, prism coupling, evanescent coupling, tapered coupling, free-space coupling, angled waveguide ends, etc., and waveguides can include but are not limited to optical fibers, planar waveguides, embedded fibers, etc. Different examples can have different regions of the optical cavity correspond to the coupling interface 214 for the signal-input/output fields, control-input/output fields, and the register output field, including on diametrically opposing sides, above, below, inside, or outside a cavity ring, or anywhere that is convenient.

With the input signal pulse $S_{IN}(t)$ having an arbitrary TM structure and a central/carrier frequency that matches the resonant-mode signal field S(t) of the nonlinear optical cavity 202, any selected TM component of the input signal pulse $S_{IN}(t)$ can be selectively frequency shifted into the resonant cavity mode register field C(t) by tailoring the time-dependence of the intracavity control field Ω(t) in relation to the input signal pulse $S_{IN}(t)$. In representative examples, the conversion is 100% selective, and orthogonal TM components of the input signal pulse $S_{IN}(t)$ are coupled out of the optical cavity 202 and into the waveguide 208 as pulsed modes of the output signal pulse $S_{OUT}(t)$ at the same frequency of the input signal pulse $S_{IN}(t)$ but with a unitarily modified TM structure. In other examples, less than 100% selectivity is achieved, such as 99.9% or greater, 99.0% or greater, 98% or greater, 95% or greater, 90% or greater, 80% or greater, 60% or greater, 50% or greater, etc. To achieve TM conversion with 100% selectivity, (a) a cavity lifetime $\tau_C$ of the resonant register field C(t) is much larger (e.g., by two orders of magnitude, three orders, four orders, etc.) than a cavity, lifetime $\tau_S$ of the resonant signal field S(t), i.e., $\tau_C \gg \tau_S$, and (b) a rate of temporal variation (or time over which significant signal variation occurs $\Delta t_S$) of the input signal pulse $S_{IN}(t)$ is slower than the cavity-decay rate (or cavity lifetime $\tau_S$) of the resonant signal field S(t), such that the input signal pulse $S_{IN}(t)$ is in the "bad-cavity" limit, i.e., $\Delta t_S \gg \tau_S$ (also referred to herein as the "two conditions"). For example, the rate of temporal variation can correspond to a bandwidth of $S_{IN}(t)$ that is smaller than a cavity resonance FWHM at frequency $\Omega_{IN}(t)$. The second condition (bad-cavity limit) implicitly necessitates that the lifetime $\tau_S$ of the resonant signal field S(t) be several times larger (e.g., 2×, 5×, 10×, 100×, etc.) than a round-trip time $t_{TRIP}$ of the optical cavity 202, i.e., $\tau_S \gg t_{TRIP}$. In other words, the quality factor Q of the optical cavity 202 for the signal field S(t) is significantly larger than unity. Thus, all time-scales for amplitude variation of the various fields, e.g., $S_{IN}(t)$, $S_{OUT}(t)$, $\Omega_{IN}(t)$, C(t) in the process are rendered much larger than the cavity round-trip time $t_{TRIP}$. A mathematical proof corresponding to the above operation is derived and shown in detail in the Reddy article and reproduced in part below.

The magnitude of the amplitude of a circulating, resonant field in a realistic optical cavity, such as the optical cavity 202, will not remain constant over time in the absence of a non-zero input, but will instead decay exponentially with time, the rate of which defines a cavity lifetime for the optical cavity (at that particular resonance frequency, such as $\tau_S$, $\tau_C$). The decay is due to loss of amplitude from material absorption, to radiative leakage modes, or through outcoupling to guided traveling modes in adjacent waveguides, such as the waveguides 209, 211. Loss due to absorption and radiative leakage typically depends on the quality of the materials of the optical cavity 202 and the fabrication process of the optical cavity 202, and can be minimized with material selection, fabrication process selection, and technological improvements. Loss due to outcoupling from the optical cavity 202 to guided traveling-wave modes (e.g., in waveguides 209, 211) can be controlled by modeling the phase-matching coupling conditions of the cavity-waveguide geometric layout and fabricating the configuration of the optical cavity 202 and adjacent waveguides 208-211 that provide the selected outcoupling loss.

Figure 3:
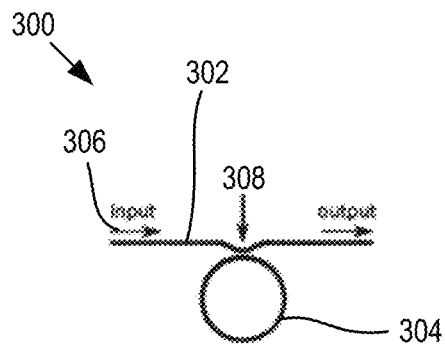
FIG. 3 is a schematic representation of an example ring-shaped optical cavity evanescently coupled to an adjacent cavity.

A particular example of controlled outcoupling of loss is shown in a cavity coupling layout 300 shown in FIG. 3. The cavity coupling layout 300 includes a linear waveguide 302 and an adjacent ring cavity 304. Traveling-wave modes 306 are directed into and guided along the linear waveguide 302 and are evanescently coupled to the ring cavity 304 at a kink 308 in the structure of the linear waveguide 302. In other ring cavity examples, a region of the ring cavity 304 can include a dichroic surface (e.g., with a dichroic coating) situated to allow outcoupling of selected frequencies to an adjacent waveguide.

As stated above, distinctly identifiable signal field S(t), control field $\Omega(t)$, and register field C(t), oscillate in optical cavity examples herein. Moreover, the cavity lifetime $\tau_C$ for the register mode field is much larger than the cavity lifetime $\tau_S$ of the signal mode field. Such differential lifetimes for different frequency bands can be engineered by interferometrically enhancing or suppressing the coupling of traveling waveguide modes to cavity modes at the desired frequencies. For example, coupling coefficients for the different frequencies can be configured to have different values, such as with different reflectivities at the different frequencies (e.g., one or more optical coatings that produce a corresponding reflectivity profile), or with different evanescent coupling parameters at the different frequencies (e.g., variation in an evanescent gap distance separating the optical cavity and the input/output waveguides). In general, evanescent coupling has an associated natural dichroism based on the longer wavelength (smaller frequency) modes having evanescent fields that extend laterally, farther relative to a propagation direction than shorter wavelength (larger frequency) modes. The coupling at a selected frequency can be adjusted (usually at the expense of coupling at other frequencies) interferometrically, by various parameters, including length of a coupling region.

Figure 4:
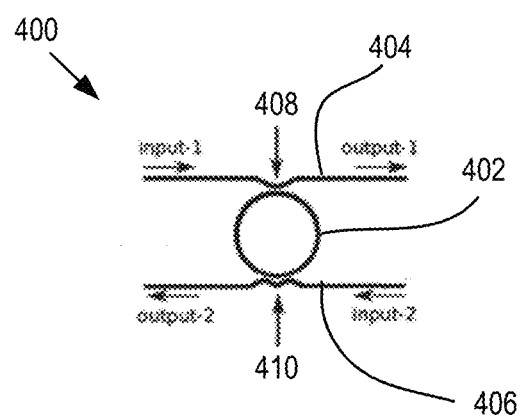
FIG. 4 is another schematic of an example ring-shaped optical cavity evanescently coupled to an adjacent waveguide.

In some examples optical multiplexers can be configured such that the input/output TMs of both the signal field S(t) and the control field $\Omega(t)$ (and the register field C(t) in some examples) can be guided in a single adjacent waveguide, such as with the cavity coupling layout 300 shown in FIG. 3. In some examples, additional waveguides and/or coupling interfaces can be used. FIG. 4 shows an example optical multiplexer 400 that couples different resonant modes of an optical cavity 402 to couple to different adjacent waveguides 404, 406 with different selected coupling coefficients at respective engineered coupling regions 408, 410. For convenience of illustration, various examples are described herein in relation to coupling to a singled adjacent waveguide, though it will be appreciated that various multiplexing processes and effects can be achieved with multi-waveguide embodiments as well. As shown, engineered coupling regions 408, 410 include one bend (or kink) and two bends, respectively, to visually differentiate two different coupling structures. Additional bends, or other coupling region parameter variation (bend radius, waveguide cross-section, length, materials, etc.) can increase or decrease interferometric coupling for one frequency relative to another. For example, Lu et al. (arXiv:1805.04011v1, 2018) (incorporated herein by reference) shows an example of separate waveguides being coupled to a micro-ring cavity using different geometries to define different coupling profiles with dichroism in the coupling Q-factors for three separate frequencies.

As discussed in the Reddy article and hereinafter, applying the two conditions discussed hereinabove to the coupled-mode equations governing the time-evolution of the signal field S(t) and the register field C(t) can allow construction of closed-form expressions for the shape of the control field $\Omega(t)$ that provides selectivity for any TM component in $S_{IN}(t)$ that is selected to convert. Conversely, closed-form expressions for the TM component that any given control-field function $\Omega(t)$ targets for frequency conversion can also be derived.

The solutions to the coupled-mode equations of motion for the signal field S(t) and the register field C(t) can be expressed as linear integral scattering relations between input and output temporal modes using Green's functions. Green's functions are functions of both an input-mode time argument and an output-mode time argument. For mode discriminatory processes, the Green's functions should be separable (as a product of two functions) in their time arguments, which is impossible for time-stationary processes. A key requirement for achieving Green's function separability in previous cavityless, traveling-wave approaches has been a large difference in the group velocities between the various frequency bands. This large difference is required because orthogonal TMs can share very similar (even identical) temporal features in local time slices. For a quantum pulse gate (QPG) to perform different transformations on these two orthogonal TMs, the full global mode structure needs to be surveyed by the device, as the effect (depletion/enhancement/phase-shift) on any given time slice should depend on features in all other time slices. Differing group velocities cause pulsed modes field amplitudes from different time slices to convect through each other, providing an effective means of carrying local mode information across different time slices. In general, temporal mode interference (TMI) operates by causing convecting pulses to overlap in spacetime over multiple stages, with the interaction being semi-perturbative during each stage. This avoids coherent-propagation ringing effects induced by cascaded second-order nonlinearity, and ensures Green's function separability even at high conversion efficiencies. In examples of the disclosed cavity-based technology described herein, inter-pulse convection is ensured by confining the TMs of one of the bands in physical space as the other TMs pass through it. Thus, by providing a large difference in finesse across the frequency bands, representative examples herein provide temporal mode selectivity for control fields and signal fields with arbitrary relative group velocities, thereby providing additional advantages over cavityless traveling-wave QPG implementations.

The following explanatory analysis is described in relation to a nonlinear waveguide example that forms a resonant ring cavity, such as the optical cavity 202, and assumes frequencies that are phase matched for the control field $\Omega(t)$, signal field $S_{IN}(t)$, and converted register field C(t). In the example shown, the cavity input-output coupling is frequency dependent, though both S(t) and C(t) modes have high finesse. With a smooth input signal pulse having a relatively long duration, this allows the bad-cavity limit (only) for the signal field S(t), meaning that the signal field S(t) tends to leak from the cavity relatively rapidly. Concurrently, the cavity has much higher finesse for the register field C(t) than for the signal field S(t). Then, the short input pulse $S_{IN}(t)$ is frequency converted into a long-lived, resonant cavity mode at the frequency of the register field C(t)

(e.g., $\omega_C$) that is trapped within the cavity before the register field C(t) slowly leaks exponentially from the cavity.

The well-justified theoretical model presented below predicts that for a given temporal shape of the control field $\Omega(t)$ inside the cavity, only a single temporal mode of the incoming signal field $S_{IN}(t)$, called the target mode, will be frequency converted (e.g., up-converted in sum-frequency interaction), creating narrowband light that is trapped in the cavity in the register field mode C(t). All TMs temporally orthogonal to the target mode will be transmitted into the signal field $S_{OUT}(t)$ beam with the original $S_{IN}(t)$ carrier frequency. The trapped light of the register field mode C(t) can subsequently be allowed to leak slowly from the cavity at later times, or it can be rapidly read out (ejected) from the cavity by applying a subsequent control pulse, which converts it back to the frequency of the original signal field $S_{IN}(t)$.

As discussed above with respect to the conditions required for operation, the temporal widths of the control field $\Omega(t)$ and the signal input $S_{IN}(t)$ must be much longer than the cavity round-trip time, but much shorter than the cavity lifetime for the register field C(t) mode. This leads to negligible leakage of the converted register field C(t) amplitude from the cavity during the process. The register field C(t) mode then becomes analogous to a coherent spin wave (for example) in a cold atomic ensemble. The cavity-coupling coefficients are assumed to put signal field S(t) in the "bad-cavity" limit. This finesse differential across the frequency bands, created by frequency-dependent coupling can break the interaction symmetry and yield efficient TM multiplexing.

Within the adopted parameter ranges, systems can be described using the standard input-output theory of Collett and Gardiner (M. J. Collett and C. W. Gardiner, "Squeezing of intracavity and traveling-wave light fields produced in parametric amplification," Phys. Rev. A 30, 1386-1391 (1984), incorporated herein by reference). The approximations leading to this formalism require very weak coupling of the cavity modes to external freely propagating modes, and spectral widths of all signals significantly narrower than the free-spectral range of the cavity.

The weak quantum signal fields within the cavity are represented by annihilation operators S(t) for the signal input field and C(t) for the converted register field, and satisfy commutators $[C(t), C^\dagger(t)]=1$, $[S(t), S^\dagger(t)]=1$. The input fields immediately outside of the coupling mirror are $S_{in}(t)$; $C_{IN}(t)$, which satisfy $[A_j(t),A_k^\dagger(t')]=\delta_{jk}\delta(t-t')$, and the outgoing fields are $S_{OUT}(t)$, $C_{OUT}(t)$.

$\Omega(t)$ is taken to be the intracavity control field in an auxiliary mode, which in the "bad-cavity" limit can be proportional to an incident field $\Omega_{IN}(t)$. The square-root of the control field energy is absorbed into a nonlinear interaction parameter $\alpha$ such that $\Omega(t)$ is square-normalized to one. Both S(t) and C(t) fields are assumed to be exactly resonant with their cavity modes and there is no phase mismatch for the SFG process. Then the equations of motion within the cavity are:

$$\partial_t S(t) = i\alpha\Omega^*(t)C(t) - \tilde{\gamma}_s S(t) + \sqrt{2\gamma_s} S_{in}(t), \quad (1)$$

$$\partial_t C(t) = i\alpha\Omega(t)S(t) - \tilde{\gamma}_c C(t) + \sqrt{2\gamma_c} C_{in}(t). \quad (2)$$

where $\tilde{\gamma}_s = \gamma_s + \kappa_s$, $\tilde{\gamma}_c = \gamma_c + \kappa_c$. The (real) damping rates $\gamma_j$, $\kappa_j$ (j=s, c) correspond to unitary decay from the cavity mode to the external modes and nonunitary decay to internal dissipative loss, respectively. For simplicity, the Langevin noise operators associated with the dissipative loss are omitted, as they do not contribute to measured signal intensities. The input-output relations are (with a chosen phase convention):

$$S_{out}(t) = -S_{in}(t) + \sqrt{2\gamma_s} S(t), \quad C_{out}(t) = -C_{in}(t) + \sqrt{2\gamma_c} C(t). \quad (3)$$

In the following discussion, it is assumed that there is no external input to the C mode, so $C_{in}(t)$ is omitted.

Equations 2 and 3 are linear in field operators (although nonlinear with respect to the control field, here an undepleted coherent state). Therefore they can describe the Heisenberg-picture operator dynamics of any quantum state of light. In the case that only a single signal photon is present throughout the system, the variables can be interpreted as Schrodinger-picture state amplitudes.

With a first condition, it is assumed that the cavity out-coupling rate $\tilde{\gamma}_s$ for the input channel is large compared to the rate at which all the fields vary—set by $\tilde{\gamma}_s$, $\tilde{\gamma}_c$ and $\alpha$, so we can apply the "bad-cavity" limit to S(t). By setting $\partial_t S(t) \to 0$, we get $$S(t) = i(\alpha/\tilde{\gamma}_s)\Omega^*(t)C(t) + \sqrt{2\gamma_s/\tilde{\gamma}_s^2} S_{in}(t) \quad (4)$$

$$\partial_t C(t) = [-f_s|\Omega(t)|^2 - \tilde{\gamma}_c]C(t) + ig_s\Omega(t)S_{in}(t). \quad (5)$$

where $f_s = \alpha^2/\tilde{\gamma}_s$, $g_s = \alpha\sqrt{2\gamma_s/\tilde{\gamma}_s^2}$.

With a second condition, it is assumed that the cavity has very high finesse (is a very "good" cavity) for the C-band ($\tilde{\gamma}_c \approx 0$), and the entire process takes place well before any amplitude from C(t) has leaked out. Dropping the $\tilde{\gamma}_c C(t)$ term, the solution to eq. 5 is $$C(t) = ig_s e^{-f_s \mathcal{E}(t)} \int_{-\infty}^{t} e^{f_s \mathcal{E}(t')} \Omega(t') S_{in}(t') dt', \quad (6)$$

where $\mathcal{E}(t) = \int_{-\infty}^{t} |\Omega(t'')|^2 dt''$. The SFG-cavity mode amplitude at the end of the process C($\infty$) equals zero for any $S_{in}(t')$ that is orthogonal to $e^{f_s \mathcal{E}(t')}\Omega^*(t')$. The function $e^{f_s \mathcal{E}(t')}\Omega^*(t')$ is thus the optimal TM for storage in this cavity. Hence, the process can be perfectly temporal-mode selective, within the approximations made herein. The perfect discrimination arises from the fact that the Green's function appearing in the integral for C($\infty$) is $e^{-f_s \mathcal{E}(t)} e^{f_s \mathcal{E}(t')}$, which is separable in the input and output variables t, t'. Thus, the optimal input TM is defined as:

$$S_{in,opt}(t) = N\Omega^*(t)\exp[f_s \int_{-\infty}^{t}|\Omega(t')|^2 dt'], \quad (7)$$

where $N = \sqrt{2f_s/(e^{2f_s}-1)}$ ensures that the square of $S_{in,opt}(t')$ integrates to 1.

This dichroic-finesse cavity scheme is not only highly TM discriminatory, but is also highly efficient, under the assumption that there are negligible internal dissipative losses, that is $\gamma_S = \tilde{\gamma}_S$. In this case, the efficiency is unity if the output field $S_{out}(t')$ is zero. In the case that the input is given by eq. 6, the total unconverted signal energy (photon number) behaves as $W_{out} \to \exp(-2f_s)$, the trend toward zero being achieved with increasing $f_s$. This prediction is valid only up to a certain value of control field strength, beyond which the system is driven out of the bad-cavity regime and the conversion efficiency degrades, as discussed below.

To verify the scheme can operate as a high-selectivity quantum pulse gate, the more accurate eqs. 1 and 2 are solved numerically. Unless stated otherwise, the control field is taken to be Gaussian, $\Omega(t) = (2/\pi)^{1/4} \exp[-(t-3)^2]$. Time units are relative to the duration of this dimensionless control pulse. The first goal is to show that the optimal input pulse, designed according to eq. 7, leads to efficient transfer of incoming energy into the frequency-converted cavity mode. It is continued to assume negligible internal cavity loss.

FIGS. 5A-5D shows simulation results in the dichroic-finesse cavity scenario, for the case $\gamma_S = 10.1$ and $\gamma_C = 0.010$, or dimensionless cavity lifetimes $1/\gamma_S=0.09$; $1/\gamma_C=99.99$. The value of nonlinear coupling, dependent on control pulse energy, is optimized to be $\alpha=5.5$. As expected, larger values begin to drive the system out of the bad-cavity regime and worsen the conversion efficiency (not shown). The integrated signal input energy equals 1.

Figure 5A:
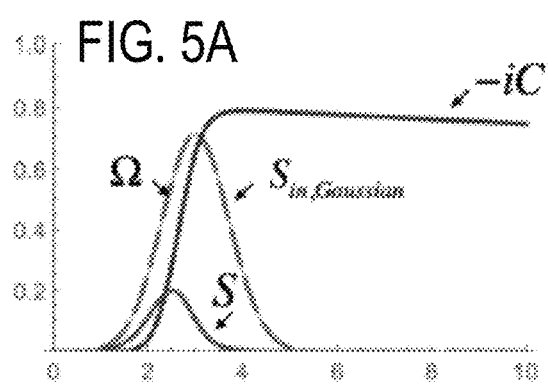
FIGS. 5A-5D show numerical simulations of amplitude versus time for (5A, 5B) Gaussian signal input and (5C, 5D) the optimal input temporal mode. The input signal $S_{IN}$ and the control pulse $\Omega$ are multiplied by 0.8 for convenient plotting. Parameters for both cases: $\alpha=5.5$; $\gamma_S=10.1$; $\gamma_C=0.01$.
Figure 5C:
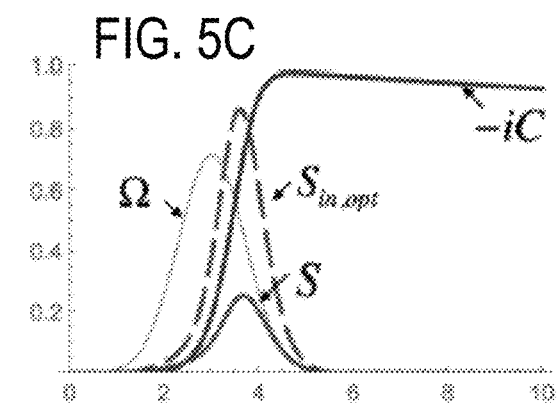
Figure 5B:
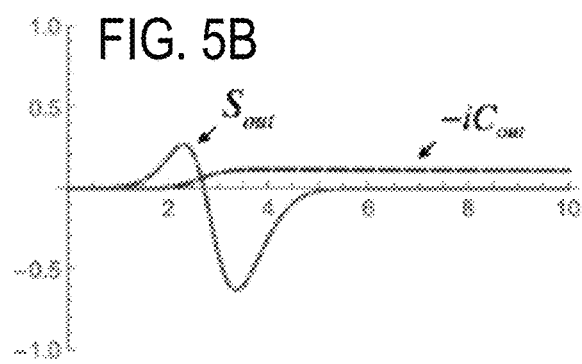

FIGS. 5A-5B show the result for the case that the input signal shape $S_{IN,Gaussian}$ is identical in shape to the control pulse $\Omega$, not the optimal case. The cavity mode S reaches a maximum of about 0.2 before rapidly decaying. The converted cavity mode amplitude, plotted as $-iC$, reaches a value 0.8 before it begins a slow exponential decay into the output channel $C_{OUT}$. The output channel $S^{OUT}$ shows significant leakage and thus poor storage efficiency. The unconverted signal energy $W_{OUT}$ equals 0.36 in this case with a non-optimized input pulse shape.

Figure 5D:
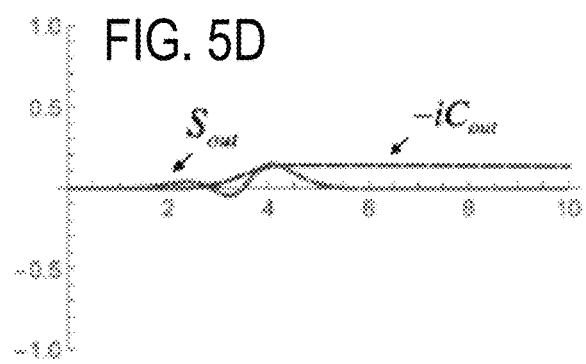

FIGS. 5C-5D show the case that the input signal shape is given by eq. 6, which is predicted to be optimal. In this case the unconverted signal energy $W_{OUT}$ equals 0.016, meaning less than 2% of the incoming pulse is not initially trapped in the frequency-converted cavity mode. Correspondingly, the trapped mode C amplitude reaches a value near 1.0 before it begins a slow exponential decay. This means that a properly designed input pulse can achieve high storage efficiency, analogously to results found in atomic-based quantum memories.

Any TM orthogonal to the optimal mode given, by eq. 7, is predicted to pass through the cavity system and not frequency convert. FIGS. 6A-6D show numerical solutions of eqs. 1 and 2 for two such modes, and, indeed the conversion efficiency is very small for each. Orthogonal modes, denoted mode 1, mode 2, and so on, are constructed numerically using a Gram-Schmidt procedure starting from the optimal mode used earlier in FIGS. 5A-5D.

Figure 6A:
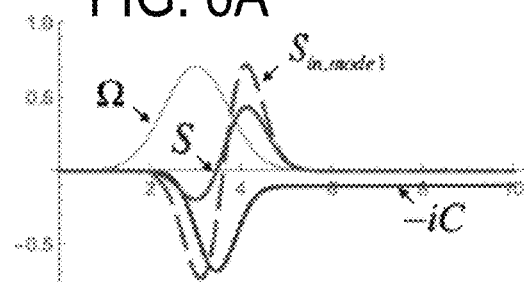
FIGS. 6A-6D show numerical simulations of amplitude versus time for two temporal modes that are orthogonal to the optimum TM used in FIGS. 5A-5D. Both remain nearly completely unconverted. Similar parameters and plotting characteristics are shown in FIGS. 5A-5D.
Figure 6C:
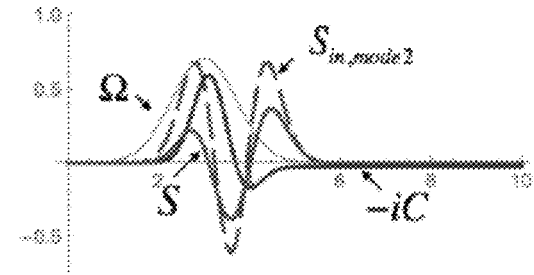
Figure 6B:
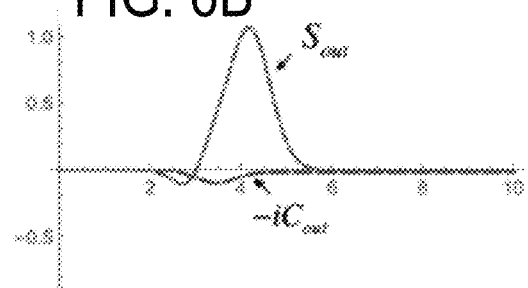
Figure 6D:
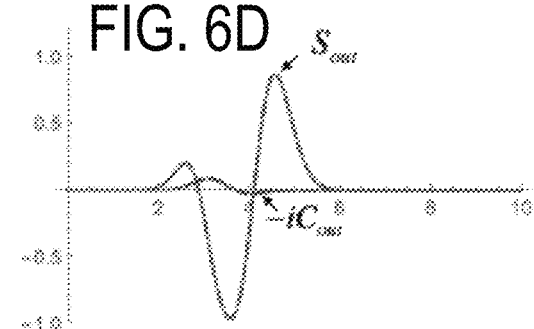

FIG. 6A shows as the dashed curve the input mode 1, which resembles a Hermite-Gaussian-1 function. The converted cavity mode amplitude $-iC$ reaches a value $-0.7$ then rapidly returns to a small value around $-0.1$ before beginning a slow exponential decay into the output channel $C_{OUT}$. The unconverted output channel $S_{OUT}$ in FIG. 6B shows large leakage. The unconverted signal energy $W_{OUT}$ equals 0.98 in this case, that is, it remains nearly completely unconverted. FIG. 6C shows as the dashed curve the input mode 2, which resembles a Hermite-Gaussian-2 function. The converted cavity mode amplitude $-iC$ oscillates and rapidly returns to a near-zero value, and the output channel $S_{out}$ in FIG. 6D shows large leakage. The unconverted signal energy $W_{OUT}$ equals 0.99 in this case, again consistent with expectations.

The simulations support operating mechanics of examples of the disclosed technology including all-optical cavity-based demultiplexers. For example, as shown with the model above, given a Gaussian control pulse, there can be an optimal signal TM that can be frequency converted efficiently and stored for a time in the cavity, while any mode that is temporally orthogonal to the optimal mode can remain without frequency conversion and can pass through the system. In the model and simulation example described, the contrast between energy conversion and nonconversion is about 50:1 for the parameters and pulses used, which is substantially better than any single-stage QPG based on traveling-wave SFG.

From a different perspective, if any particular targeted signal input TM is chosen to convert to a frequency for the mode C and to store the mode C in the dichroic-finesse cavity, the control field $\Omega$ can be configured to optimize the conversion and trapping, while avoiding conversion of any orthogonal signal TM. The condition that ensures near-100% conversion of the input pulse is $S_{OUT}(t)=0$, which from eq. 3 implies $S_{IN}(t)=\sqrt{2\gamma_S}S(t)$. Then, using the bad-cavity approximation for S, as given by eq. 4, leads straightforwardly to $\partial_t C(t)=K(t)C(t)$ and $S_{in}(t)=\mu^*\sqrt{2K}C(t)$, where $K(t)=f_s\Omega(t)^2$ and $\mu=i \exp\{i \arg[\Omega(t)]\}$. From these, the design equation for K(t) can be derived as:

$$\left(\frac{\partial_t K}{2K}\right) + K(t) = \frac{\partial_t S_{in}(t)}{\operatorname{Sin}(t)}. \tag{8}$$

An equation of this form also appears in the context of optical storage in cavity-enhanced atomic quantum memories, where it is called the "impedance matching condition." The resulting solution for the control field for optimal storage is $$\Omega_{opt(t)} = e^{i\theta} e^{-i\arg[S_{in}(t)]} \sqrt{\frac{S_{in}(t)^2}{q + 2f_s\int_{t_0}^t S_{in}(t')2_{dt'}}}, \tag{9}$$

where $\theta$ is an arbitrary phase and $q=S_{IN}(t_0)^2/|\Omega(t_0)|^2$, which for numerical purposes is a vanishingly small parameter if the arbitrary initial time $t_0$ is taken to be well before the input signal begins rising from zero value.

Figure 7A:
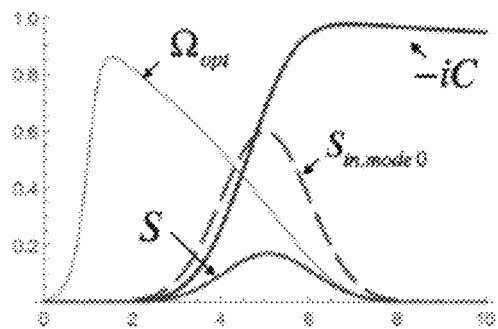
FIGS. 7A-7B illustrate the effectiveness of the control field $\Omega_{OPT}(t)$ to efficiently convert and store the targeted input mode $S_{IN}(t)$, with 7A having $S_{IN}(t)=HG_0(t)$, and 7B $S_{IN}(t)=HG_1(t)$. In both cases, using the designed control field drives the converted cavity mode amplitude −iC to near its maximum possible value of 1.0. In both cases: $\alpha=5.5$; $\gamma_S=10.1$; $\gamma_C=0.01$; $q=10^{-7}$.
Figure 7B:
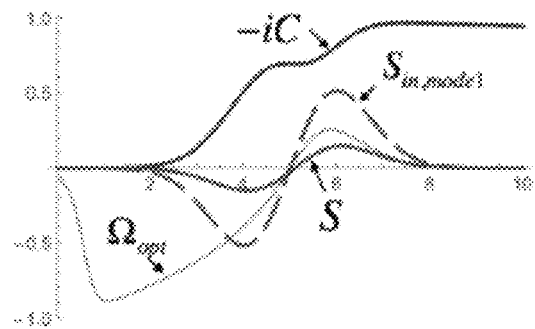
Figure 8A:
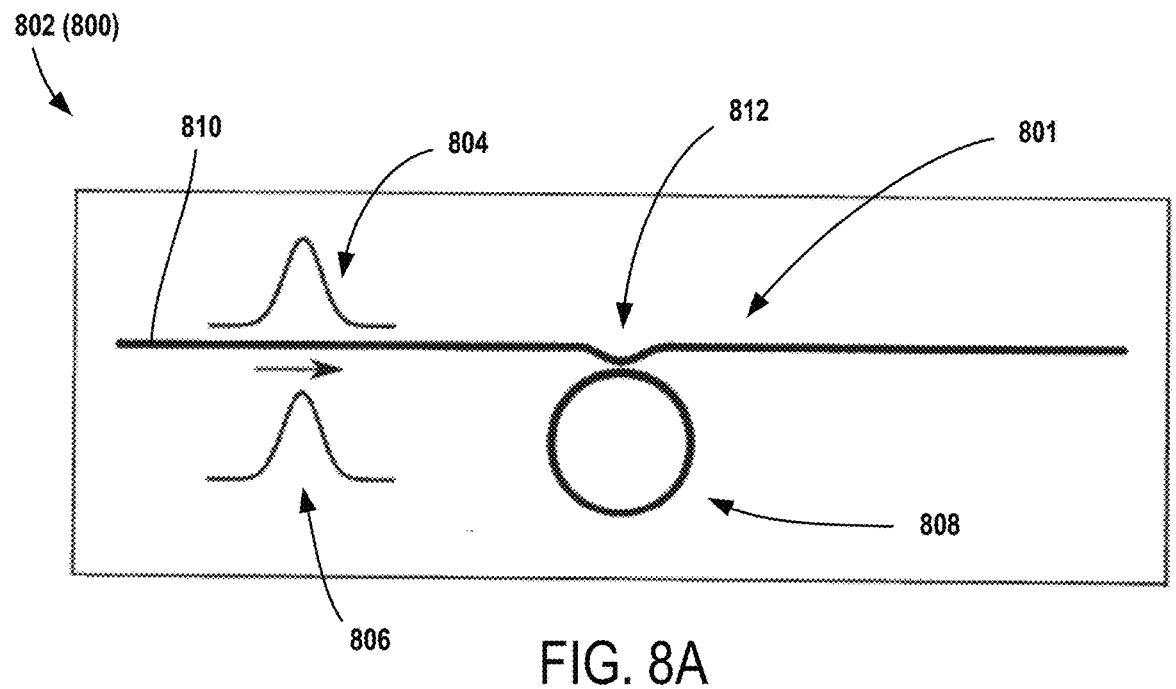
FIGS. 8A-8D show a series of stages in a read-in operation with a temporal mode conversion apparatus.
Figure 8B:
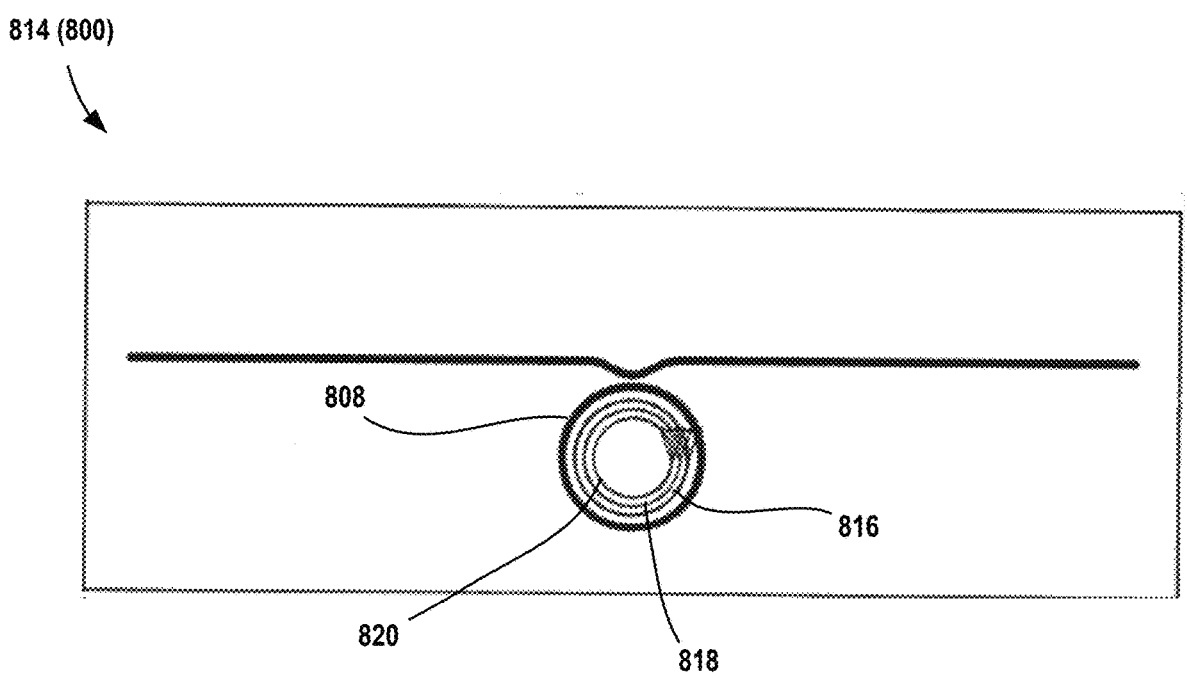
Figure 8C:
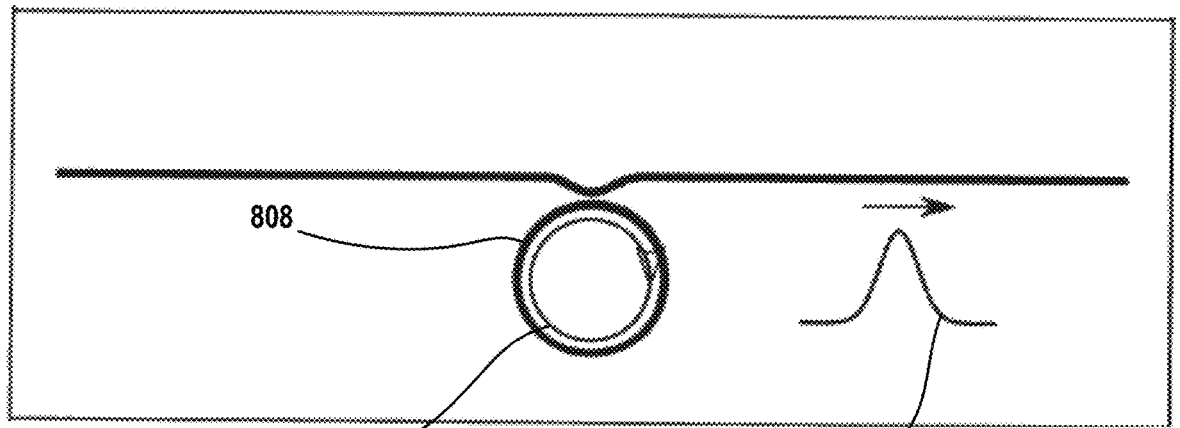
Figure 8D:
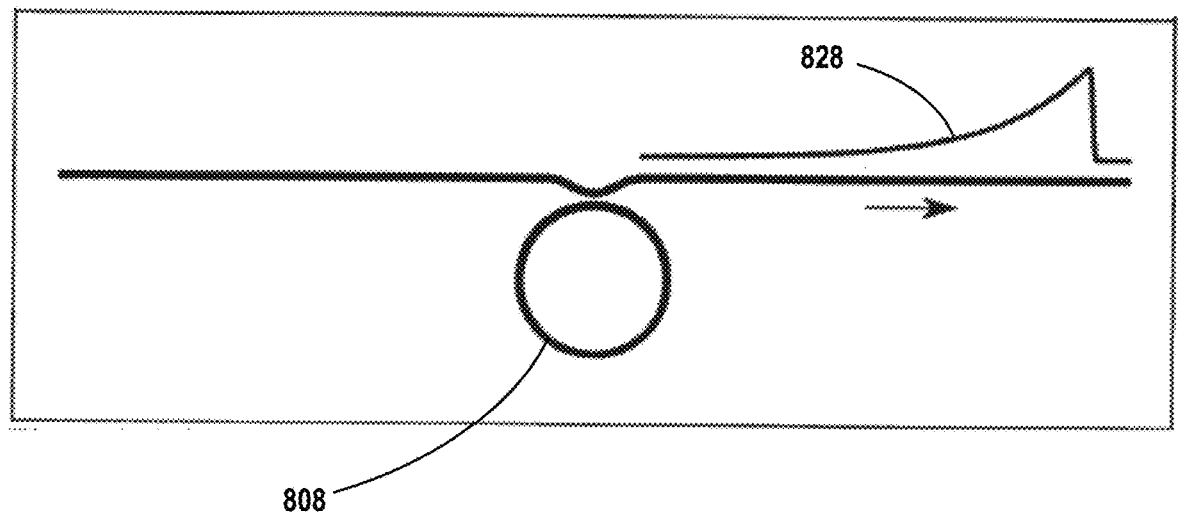

To illustrate and test this design prediction, consider as a target input signal any of the orthogonal Hermite Gaussians, $HG_n(t)=H_n(t)e^{-t^2/2}/\sqrt{2^n\pi^{1/2}n!}$. Eqs. 1 and 2 are numerically solved using eq. 9 as the control field, and the results are plotted in FIGS. 7A-7B, which show the results for $S_{IN}(t)=HG_0(t)$ and $HG_1(t)$, respectively. The value of the control strength parameter $\alpha$ is again optimized to the value 5.5. The shapes of the control fields before the signal begins turning on are arbitrary, and set by the value $10^{-7}$ of the parameter q. The unconverted signal energy shown in FIG. 7A is 0.004, and in FIG. 7B is 0.015, showing excellent conversion and trapping of the targeted input TMs.

If we choose the unit time scale in the simulations as 100 ps, the duration of the control pulse in FIGS. 5A-5D is 166 ps. Assuming a round-trip time 10 ps and group velocity c/2 gives a cavity round-trip length 150 μm. The cavity leakage parameters ($\gamma_S$=10.1, $\gamma_C$=0.01) corresponding to rates 1.01× $10^{11}$ s$^{-1}$ and 1.0×10$^8$ s$^{-1}$ (and cavity-field lifetimes 10 ps and 10 ns) respectively. For carrier wavelengths 1550 nm and 775 nm for S and C modes, respectively, the "dichroic" cavity quality factors needed are $Q_S=\omega_S/2\gamma_S$=6020 and $Q_C=\omega_C/2\gamma_C$=1.2×10$^7$. Finally, the internal dissipative losses should typically be much smaller than $\gamma_S$; $\gamma_C$. These values, along with the needed control power, are within range of achievable values for, e.g., whispering-gallery resonators or planar-waveguide micro-rings coupled evanescently to an external waveguide.

Thus, representative examples of the disclosed technology can offer several functionalities directly applicable to quantum information science. Orthogonal temporal modes of light can be multiplexed and/or demultiplexed, including with high TM discrimination and efficiency in typical examples. Some examples can be reconfigurable in real time to target any chosen TM by altering the shape of the control field that drives the sum-frequency generation or other nonlinear optical process. The efficiency of TM demultiplexing can be tunable in real time by altering the intensity of the control field, giving the possibility to create and measure single-photon states that are superpositions of two time-bin states. Some examples can be used as a short-time all-optical memory, with the storage time being limited by cavity Q and losses. Particular examples can be used to reshape optical pulses via the read-in, read-out process.

Operationally, as discussed above, example devices can be used to capture completely a TM input into the resonant register mode C(t) by optimizing a shape of the control field $\Omega(t)$. A "read-in" operation 800 is illustrated in FIGS. 8A-8D at various stages of completion for an example TM conversion device 801. At an input stage 802 shown in FIG. 8A, a target TM signal-input pulse 804 that includes one or more temporal modes, and a control-input pulse 806 typically optimized for efficient TM conversion of the target TM signal-input pulse 804, are propagating towards an optical cavity 808. In typical examples, the input pulses 804, 806 are propagating along an optical waveguide 810 that is optically coupled to the optical cavity 808, e.g., through evanescent or dichroic coupling, at a coupling region 812. In an interaction phase 814 shown in FIG. 8B, the input pulses 804, 806 are partially populating corresponding cavity modes 816, 818 in the optical cavity 808, and therefore exchanging amplitude with a register-band cavity mode 820. In a post-interaction phase 822 shown in FIG. 8C, a remnant control-field energy 824 propagates away from the optical cavity 808, leaving the optical cavity 808 with non-zero amplitude stored in a register-band resonant mode 826. This register-band resonant mode 826 can, if desired, be allowed to slowly leak out (owing to the relatively long-lived nature of the register band) into a guided mode 828, as shown in a subsequent stage 830 in FIG. 8D, leaving behind an empty optical cavity 808.

Figure 9A:
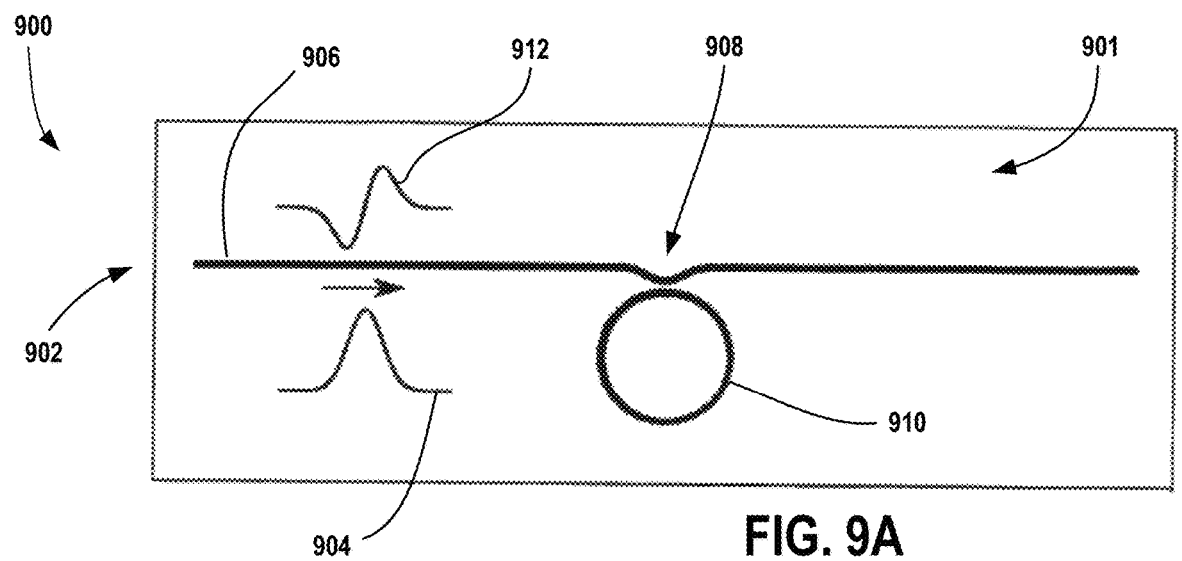
FIGS. 9A-9C show another series of stages of a read-in type operation with a temporal mode conversion apparatus with a mismatched (orthogonal-to-target) temporal mode input.
Figure 9B:
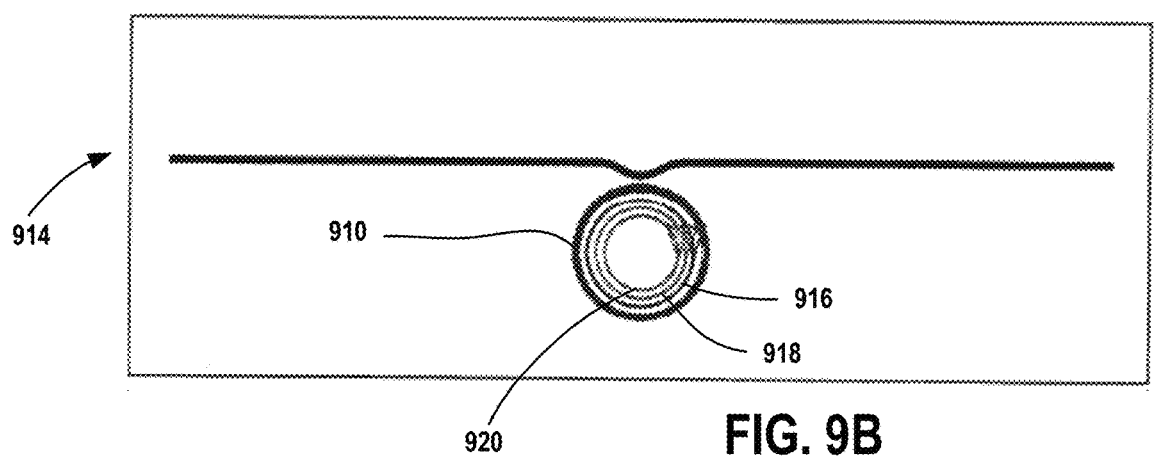
Figure 9C:
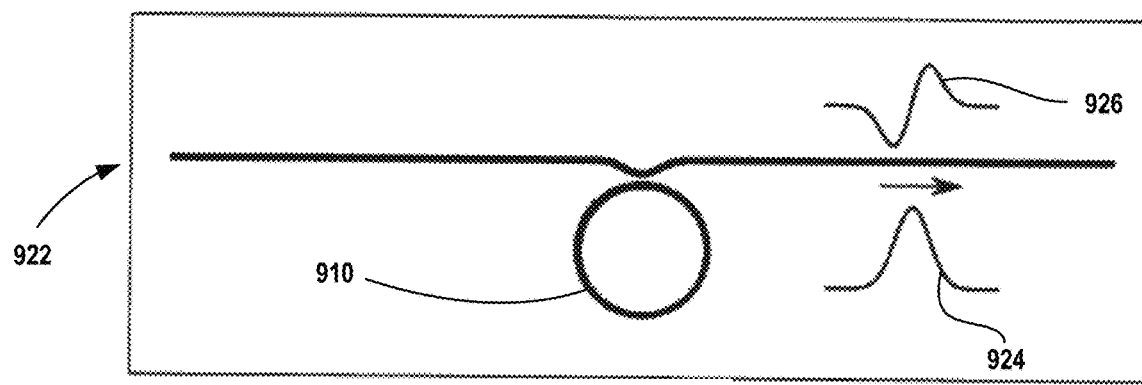

FIGS. 9A-9C depicts an example read-in operation 900 for a TM conversion device 901, which can be similar to the example TM conversion device 801. In an input stage 902 shown in FIG. 9A, a control input-pulse 904 that is optimized for the conversion of the TM of the TM signal-input pulse 804 shown in FIG. 8A, propagates along a waveguide 906 to a coupling region 908 with an optical cavity 910. A TM signal-input pulse 912 also propagates along the waveguide 906 but the temporal mode(s) of the TM signal-input pulse 912 are orthogonal to the selectively targeted TM of the TM signal-input pulse 804. Thus, at the input stage 902, the mismatched TM signal-input pulse 912 and control input-pulse 904 propagate towards the empty optical cavity 910. At an interaction stage 914 in FIG. 9B, the amplitudes of the fields of the input pulses 904, 912 are coupled into the optical cavity 910 to signal and control cavity modes 916, 918 that interferometrically couple with a register-band resonant mode 920. Because the read-in operation 900 is highly TM selective, in a post-interaction stage 922 shown in FIG. 9C, both a remnant control-field energy 924 and an output signal pulse 926, corresponding the entire amplitude of the TM of the signal-input pulse 912, propagate away, leaving behind an empty optical cavity 910. If the signal-input pulse 912 had been in a superposition of both the target TM of the TM signal-input pulse 804 shown in FIG. 8A and the orthogonal TM of the signal-input pulse 912, then the read-in operation 900 would have stored the amplitude of the target TM component in the register-band cavity mode 920 and allowed the orthogonal-TM amplitude to escape in the output channel, thus spatially separating the TMs in the two respective signal and register outputs.

Figure 10A:
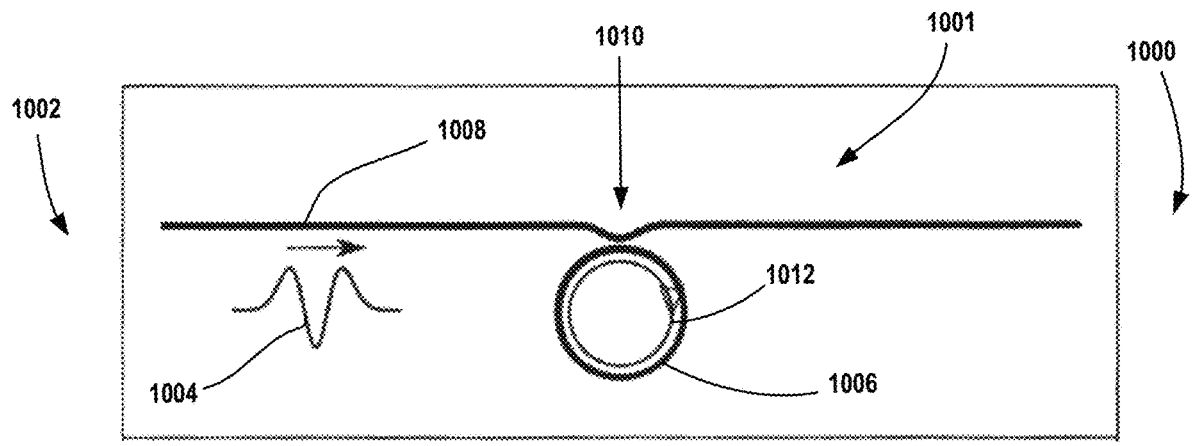
FIGS. 10A-10C show a series of stages in a read-out operation of a stored register-band resonant mode into a specific signal output temporal mode.
Figure 10B:
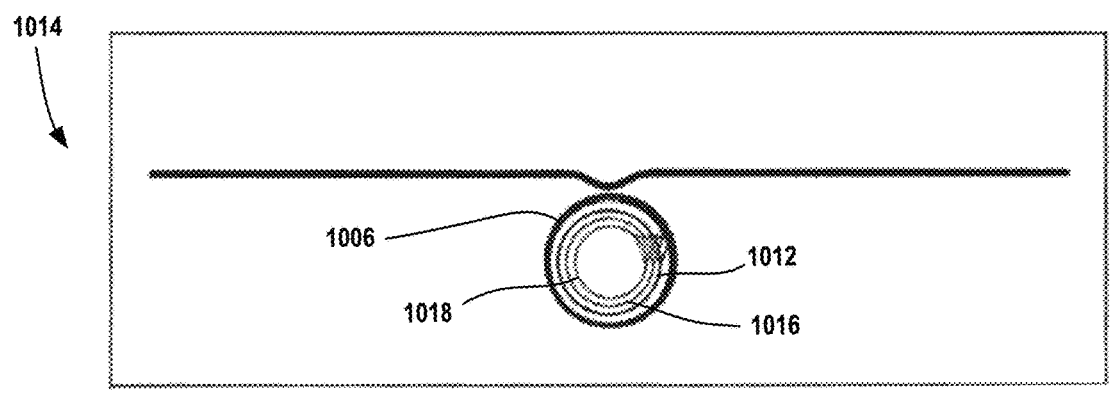
Figure 10C:
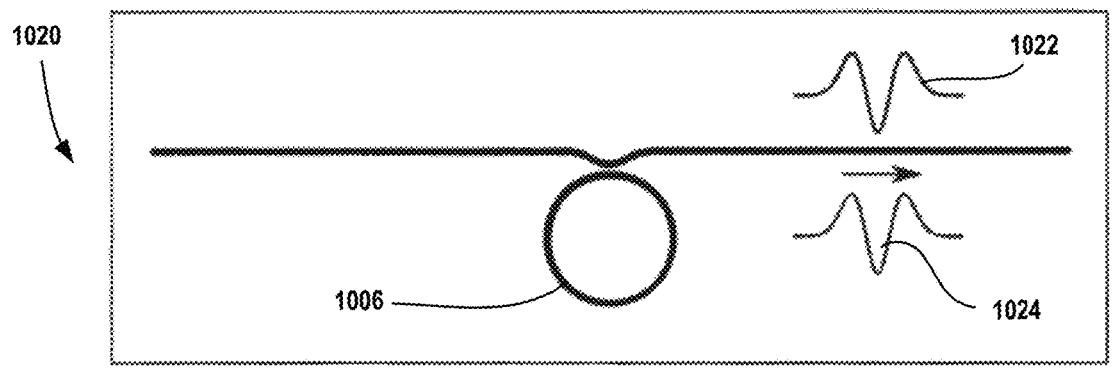

Example devices can be used as signal multiplexers, or as pulse shapers when used in a read-out mode. FIGS. 10A-10C illustrate an example read-out operation 1000 for TM device 1001. At an input stage 1002 shown in FIG. 10A, a specifically shaped control-input field 1004 propagates towards an optical cavity 1006 along a waveguide 1008 to a coupling region 1010 coupling the waveguide 1008 to the optical cavity 1006. The optical cavity 1006 has a stored amplitude in a long-lived register-band resonant mode 1012. During an interaction stage 1014 shown in FIG. 10B, a control cavity mode 1016 produced by the coupled control-input field 1004 mediates a transfer of amplitude from the stored register band resonant mode 1012 to a signal-band resonant mode 1018 inside the optical cavity 1006. In a post-interaction stage 1020 shown in FIG. 10C, a substantial portion or all of the amplitude of the register-band resonant mode 1012 will have been transferred to the signal-band resonant mode 1018 to form a signal-output TM 1022, which, along with a remnant control-field energy 1024 propagates away from an empty optical cavity 1006. The shape of the signal-output TM 1022 can be fully determined by the temporal shape of the control-input pulse 1004. Thus, the read-out operation 1000 can be performed immediately after a read-in operation to effectively mode map any desired input TMs to output TMs. Furthermore, the example processes described are unitary, and hence can be applicable to both classical and quantum signal inputs. Also, in some examples, the cavity phase matching condition can extend to spectrally adjacent resonance modes, allowing multiple control-field pulses centered at different frequencies to store different signal TMs in different register modes.

Some example devices can provide a practical way of implementing a 100% selective quantum pulse gate (QPG). QPG device examples herein can be built on a scalable, integrated, nanophotonics platform. Such devices can unitarily and deterministically operate on a single TM component of an arbitrary pulsed optical input, while simultaneously ensuring zero cross-talk or contamination from any orthogonal TMs of the optical input. Representative examples overcome footprint limitations associated with the only other known implementation of QPG, i.e. temporal mode interferometry, as disclosed in D. V. Reddy & M. G. Raymer, arXiv:1710.06736 (2017), and references therein. Representative examples herein can fully generalize time- and wavelength-division multiplexing of optical signals to encompass arbitrary superposition of disjoint time-frequency bin states. With example devices, photonic temporal-mode state space can be fully exploited, which is more amenable to guided geometries in integrated platforms than more traditional state spaces such as polarization or transverse-spatial modes. This capability can be used to interface between different optical-read-out quantum memories to optical networks, and to each other. Methods of operation can be all-optical and unitary, making them applicable in both classical and quantum regimes, and at cryogenic temperatures typically required by high-quantum-efficiency single-photon detectors.

Optical cavities of disclosed device examples can function as model systems for quantum memory nodes, particularly when coupled with an ability to read-in and read-out optical "flying qubits" through shaped control pulses. For example, multiple optical cavities can be coupled together to perform multiple TM conversion operations. In some examples, when scaled to several interconnected microcavities, an effective simulacrum of a multi-node quantum network can be formed. A wide variety of theoretical macro-modules can be simulated, such as fully addressable all-optical buffer RAMs (random-access memory units), time-synchronization of probabilistic quantum-resource-state emitters, storage registers for all-optical cluster-state quantum computing, etc.

Figure 11:
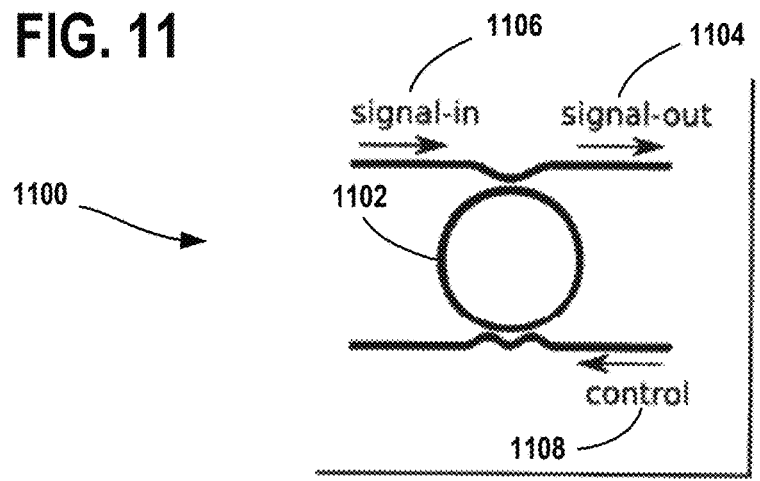
FIGS. 11-13 show examples of quantum node topologies.
Figure 12:
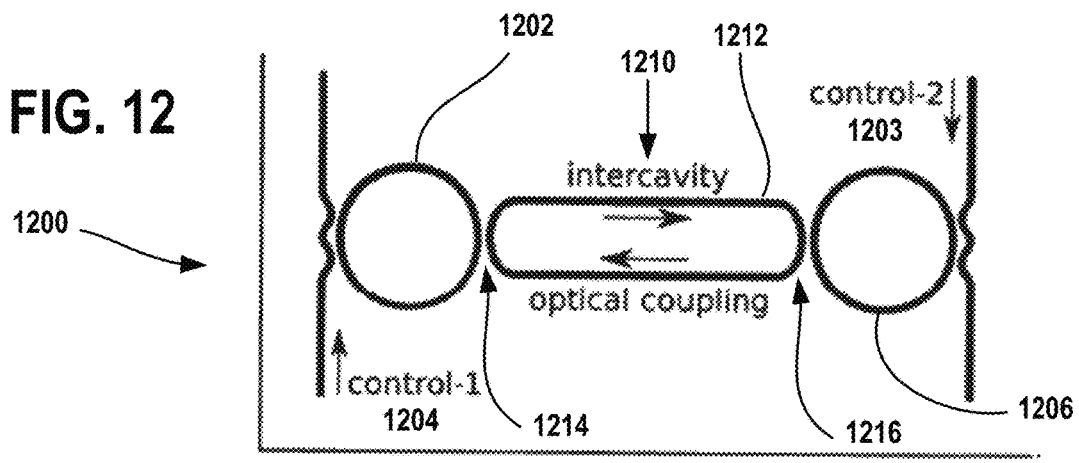
Figure 13:
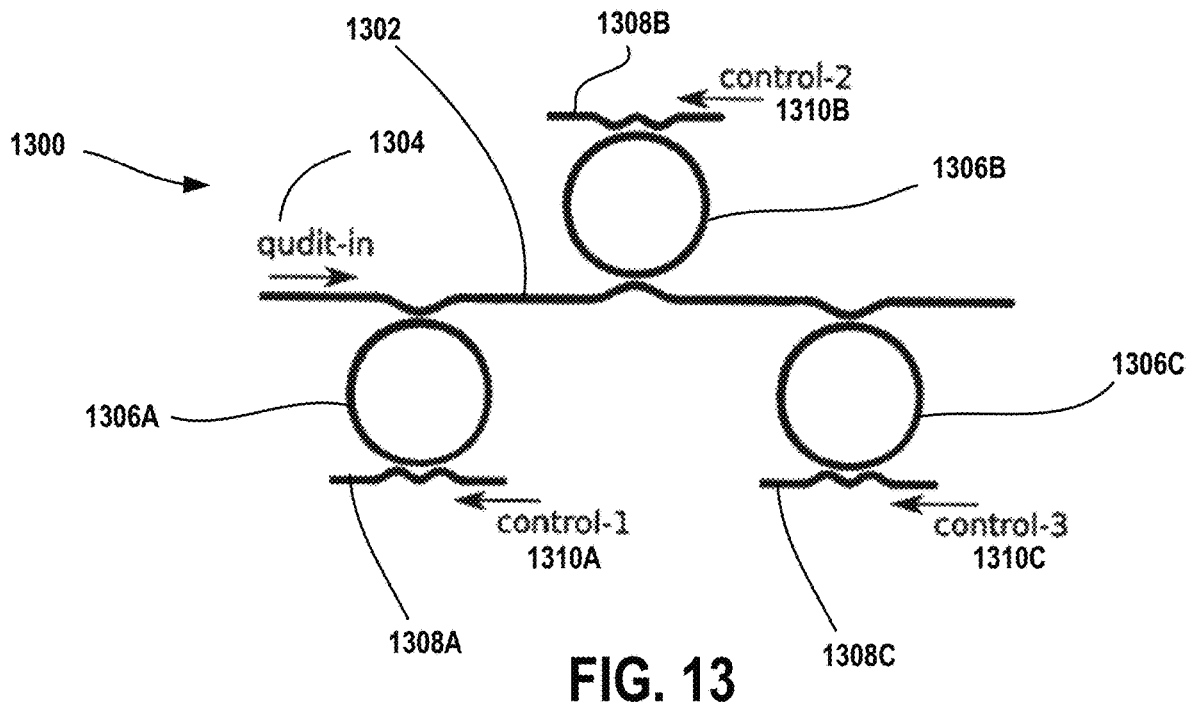

FIGS. 11-13 illustrate various applications and possible network topologies that can be formed according to examples of the disclosed technology, e.g., as multiplexers and/or demultiplexers or multiplexing/demultiplexing nodes. FIG. 11 is an example of a quantum processing node 1100 that includes an nonlinear optical cavity 1102 that can perform various TM selective operations (including, by way of example, those described hereinabove) to produce one or more optical output signal pulses 1104 based on an optical signal input pulse 1106 and an optical control input pulse 1108 that are optically coupled to the optical cavity 1102. FIG. 12 is an example of a quantum processing node 1200 that includes a first optical cavity 1202 coupled to a first control input pulse 1204 and a second optical cavity 1206 coupled to a second control input pulse 1208. The first and second optical cavities 1202, 1206 are optically coupled with an intercavity optical coupling 1210, such as a third optical cavity 1212. By way of example, the third optical cavity 1212 can be a micro-ring type resonator with selected portions forming coupling regions 1214, 1216 with the respective first and second optical cavities 1202, 1206. FIG. 13 is an example of a quantum processing node 1300 that includes an optical waveguide 1302 propagating a qudit (d-dimensional quantum digit) 1304. A plurality of nonlinear optical cavities 1306A-1306C are coupled to the optical waveguide 1302, with each being coupled to a respective control waveguide 1308A-1308C situated to receive respective control input pulses 1310A-1310C. The qudit 1304 can be selectively processed by the control input pulses 1310A-1310C without an intervening measurement event as the qudit 1304 is coupled to the nonlinear optical cavities 1306A-1306C along the optical waveguide 1302.

Figure 14:
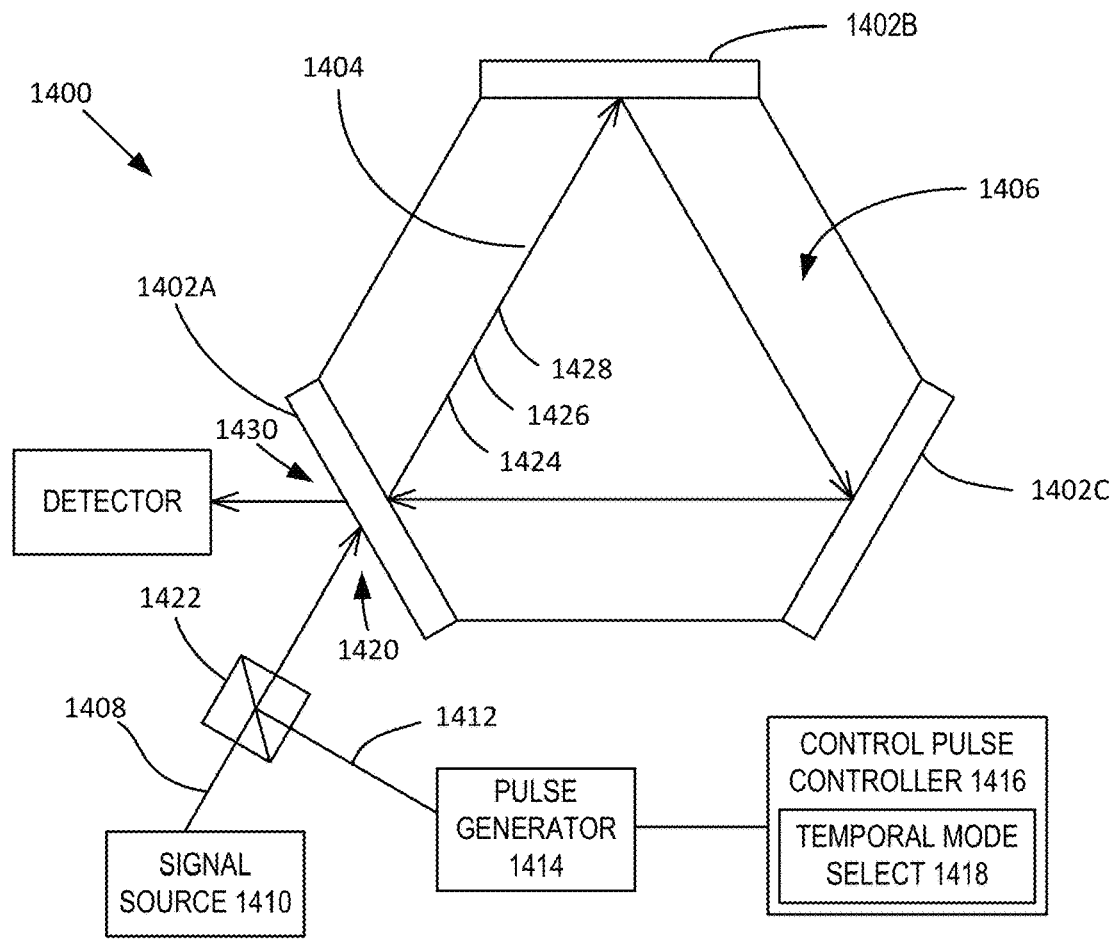
FIG. 14 shows an example TM selective optical cavity situated in a three-mirror configuration.

FIG. 14 is a three-mirror traveling-wave resonator cavity 1400 that is similar in some respects to other ring resonators described hereinabove. The cavity 1400 generally includes a three mirror elements 1402A, 1402B, 1402C arranged at angles with respect to each other (e.g., at 60°) to direct optical cavity fields 1404 along a single direction through a nonlinear optical medium 1406. The mirror elements 1402A-1402C can be flat or curved in different examples. An optical signal field 1408 is provided by a signal source 1410, such as a signal generator, a quantum node, quantum pulse gate, etc. In representative examples, the optical signal field 1408 can have an arbitrary temporal mode content. An optical control field 1412 is generated with a control pulse generator 1414. For example, arbitrary waveform generators (AWGs) are devices that can generate suitable arbitrary electrical waveforms. AWGs typically can be used to drive electro-optic elements such as EOMs or Pockels cells, which may or may not be used in conjunction with two-arm interferometers, and which can divert different amounts of power from a main beam into a side-channel depending on the magnitude the electrical signal. AWGs can be used to generate shaped optical pulses out of continuous wave lasers. Other control pulse generators can be used, including generators that shape broad-band lasers in the frequency domain, such as those disclosed in Temporal-mode-selective optical Ramsey interferometry via cascaded frequency conversion, D. V. Reddy et al. (arXiv:1710.06736) (incorporated herein by reference). The control pulse generator 1414 is coupled to a control pulse controller 1416 that includes temporal mode select 1418 that can be used to adjust the optical control field 1412 produced by the control pulse generator to correspond to different predetermined shapes that are associated with a unitary temporal mode exchange in the cavity 1400. The optical signal field 1408 and the optical control field 1412 are directed into a cavity input 1420, e.g., by combining the optical signal and control fields 1408, 1412 with a beam combiner 1422 and directing the combined optical signal and control fields 1408, 1412 to the mirror element 1402A. The coupled optical signal and control fields 1408, 1412 can excite corresponding intracavity signal and control fields 1424, 1426 of the optical cavity fields 1404. If a temporal mode is present in the intracavity signal field 1424 that corresponds to the selected temporal mode that is targeted by the generated optical control field 1412, then the temporal mode in the intracavity signal field 1424 is frequency shifted to an intracavity register field 1428. In representative examples, the shift is 100% selective such that no energy associated with the selected temporal mode remains in the intracavity signal field 1424, and any other temporal mode energies of the intracavity signal field (if others are present) are 100% unabated by the nonlinear process. In further examples, selectivities can include 99.9% or greater, 99.0% or greater, 98% or greater, 95% or greater, 90% or greater, 80% or greater, 60% or greater, 50% or greater, etc. In some examples, the extent of the transformation of the targeted temporal mode in percentage terms can be different from the extent of any transforming effects of the other untargeted temporal modes. One or more of the intracavity signal, control, and register fields 1424-1428 can be directed out of the cavity 1400 (typically in different timeframes) through a cavity output 1430, e.g., through the mirror element 1402A. Other of the mirror elements 1402B-1402C can also correspond to the cavity output 1430 or part of the cavity output 1430. Similarly, the optical signal and control fields 1408, 1412 can be coupled into different surfaces (e.g., mirror elements 14029, 1402C) of the cavity 1400. In some examples, the optical control field 1412 can be configured to unitarily frequency shift the intracavity register field 1428 that may be circulating in the cavity 1400 to the intracavity signal field 1424 that can rapidly be removed from the cavity 1400.

Figure 15:
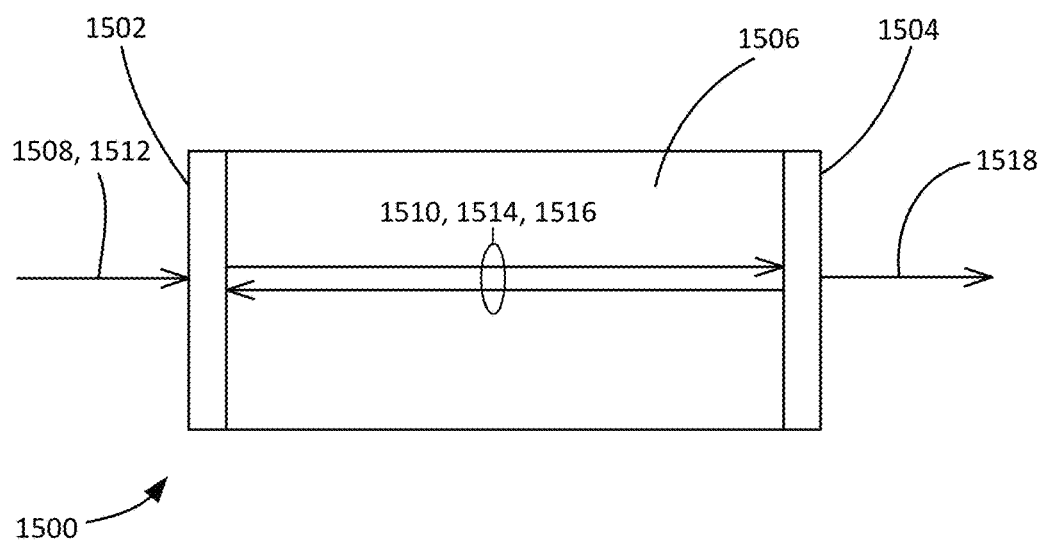
FIG. 15 shows an example TM selective optical cavity situated in a Fabry-Perot arrangement.

FIG. 15 is a two-mirror Fabry-Perot cavity 1500. The cavity 1500 generally includes two reflective elements 1502, 1504 spaced apart from each other with a nonlinear optical medium 1506 extending at least portion of (or all of) the distance between the reflective elements 1502, 1504. An optical signal field 1508 can be coupled into the cavity 1500 to form an intracavity signal field 1510 through one or both of the reflective elements 1502, 1504 and an optical control field 1512 can be coupled into the cavity 1500 to form an intracavity control field 1514 through one or both of the reflective elements 1502, 1504. An intracavity register field 1516 can be formed in the optical cavity 1500 that corresponds to a transformation (sometimes referred to as a "shift") of a targeted temporal mode of the intracavity signal field 1510 based on a tailored shape of the optical control field 1512. One or more of the intracavity signal, control, and register fields 1510, 1514, 1516 can be coupled out of the cavity 1500 through one or both of the reflective elements 1502, 1504 as output fields 1518.

Figure 16:
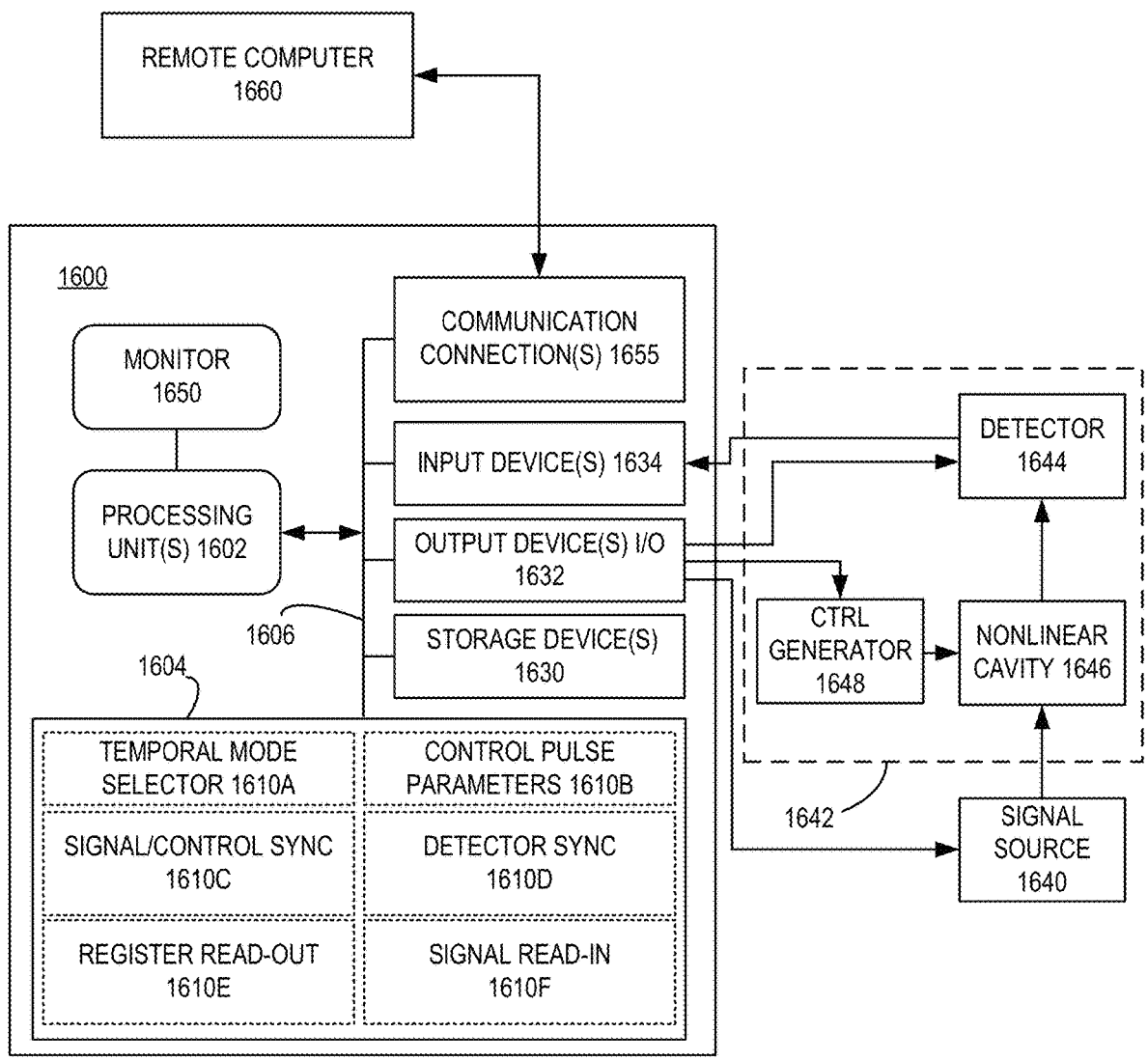
FIG. 16 shows a representative computing environment.

FIG. 16 and the following discussion are intended to provide a brief, general description of an exemplary computing environment in which the disclosed technology may be implemented. Although not required, the disclosed technology is described in the general context of computer-executable instructions, such as program modules, being executed by a computing unit, dedicated processor, or other digital processing system or programmable logic device. Generally, program modules include routines, programs, objects, components, data structures, etc., that perform particular tasks or implement particular abstract data types.

Moreover, the disclosed technology may be implemented with other computer system configurations, including handheld devices, multiprocessor systems, microprocessor-based or programmable consumer electronics, network PCs, minicomputers, mainframe computers, dedicated processors, MCUs, PLCs, ASICs, FPGAs, CPLDs, systems on a chip, and the like. The disclosed technology may also be practiced in distributed computing environments where tasks are performed by remote processing devices that are linked through a communications network. In a distributed computing environment, program modules may be located in both local and remote memory storage devices.

With reference to FIG. 16, an exemplary system for implementing the disclosed technology includes a computing device 1600 that includes one or more processing units 1602, a memory 1604, and a system bus 1606 that couples various system components including the system memory 1604 to the one or more processing units 1602. The system bus 1606 may be any of several types of bus structures including a memory bus or memory controller, a peripheral bus, and a local bus using any of a variety of bus architectures. The memory 1604 can include various types, including volatile memory (e.g., registers, cache, RAM), non-volatile memory (e.g., ROM, EEPROM, flash memory, etc.), or a combination of volatile and non-volatile memory. The memory 1604 is generally accessible by the processing unit 1602 and can store software in the form computer-executable instructions that can be executed by the one or more processing units 1602 coupled to the memory 1604. In some examples, processing units can be configured based on RISC or CSIC architectures, and can include one or more general purpose central processing units, application specific integrated circuits, graphics or co-processing units or other processors. In some examples, multiple core groupings of computing components can be distributed among system modules, and various modules of software can be implemented separately.

The exemplary computing device 1600 further includes one or more storage devices 1630 such as a hard disk drive for reading from and writing to a hard disk, a magnetic disk drive for reading from or writing to a removable magnetic disk, and an optical disk drive for reading from or writing to a removable optical disk (such as a CD-ROM or other optical media). Such storage devices can be connected to the system bus 1606 by a hard disk drive interface, a magnetic disk drive interface, and an optical drive interface, respectively. The drives and their associated computer-readable media provide nonvolatile storage of computer-readable instructions, data structures, program modules, and other data for the computing device 1600. Other types of non-transitory computer-readable media which can store data that is accessible by a PC, such as magnetic cassettes, flash memory cards, digital video disks, CDs, DVDs, RAMs, ROMs, and the like, may also be used in the exemplary computing environment. The storage 1630 can be removable or non-removable and can be used to store information in a non-transitory way and which can be accessed within the computing environment.

As shown in FIG. 16, the computing device 1600 is coupled to an output device I/O 1632 so that suitable output signals (e.g., digital control voltage and/or current signals) are provided to an optical control field generator 1648 of a quantum pulse gate 1642. Output signals can also be generated and directed to a optical signal field source 1640, and an optical detector 1644 of the quantum pulse gate 1644. The optical control field generator 1648 typically generates suitable optical control fields to a nonlinear optical cavity 1646 of the quantum pulse gate 1642 so that predetermined temporal modes can be unitarily frequency shifted and transformed in temporal shape. Input device I/O 1634 is coupled to the bus 1606 so that data signals and/or values corresponding to qudits detected with the detector 1644 can be stored in the memory 1604 and/or storage 1630 and/or processed with the processing unit 1602.

In representative examples, the quantum pulse gate 1642 can be used in a larger quantum computing process or quantum computing system. A temporal mode selection table can be stored in a memory 1610A so that desired temporal mode operations can be performed. Control pulse parameters can be stored in a memory 1610B that can be used to vary the characteristics of the optical control field to correspond to optimized selectivity for the different temporal modes in the memory 1610A. A synchronization table or subroutine that synchronizes the optical control field generated by the optical control field generator 1648 and an input optical signal field provided by the signal source 1640 can be provided in a memory 1610C. Detection intervals, gating, synchronization, etc., can be stored in a memory 1610D. Read-out operations for optical register fields generated or stored in the nonlinear cavity 1646 can be stored in a memory 1610E, and read-in operations for the optical signal field can be stored in a memory 1610F.

A number of program modules (or data) may be stored in the storage devices 1630 including an operating system, one or more application programs, other program modules, and program data. A user may enter commands and information into the computing device 1600 through one or more input devices such as a keyboard and a pointing device such as a mouse. Various other input devices can be used as well. These and other input devices are often connected to the one or more processing units 1602 through a serial port interface that is coupled to the system bus 1606, but may be connected by other interfaces such as a parallel port, game port, or universal serial bus (USB). A monitor 1650 or other type of display device is also connected to the system bus 1606 via an interface, such as a video adapter. Some or all data and instructions can be communicated with a remote computer 1660 through communication connections 1655 (e.g., wired, wireless, etc.) if desired.

Having described and illustrated the principles of the disclosed technology with reference to the illustrated embodiments, it will be recognized that the illustrated embodiments can be modified in arrangement and detail without departing from such principles. For instance, elements of the illustrated embodiments shown in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used.

In view of the many possible embodiments to which the principles of the disclosed technology may be applied, it should be recognized that the illustrated embodiments are only representative examples and should not be taken as limiting the scope of the disclosure. Alternatives specifically addressed in these sections are merely exemplary and do not constitute all possible alternatives to the embodiments described herein. For instance, various components of systems described herein may be combined in function and use. We therefore claim all that comes within the scope of the appended claims.

We claim:

1. An apparatus, comprising:
an optical cavity including an optical coupling portion situated to couple an optical signal input field to an intracavity optical signal field and an optical control input field to an intracavity optical control field, wherein the optical cavity includes a nonlinear optical medium that mediates a selective exchange of a predetermined temporal mode of the optical signal input field and an intracavity optical register field based on a nonlinear phase-matched interaction between the intracavity optical signal, control, and register fields and selectable field characteristics of the optical control input field.

2. The apparatus of claim 1, wherein a cavity lifetime of the intracavity optical register field is longer than a cavity lifetime of the intracavity optical signal field, and wherein a rate of temporal variation of the optical signal input field is slower than the cavity lifetime of the intracavity optical signal field.

3. The apparatus of claim 2, wherein the cavity lifetime of the intracavity optical register field is at least ten times longer than a cavity lifetime of the intracavity optical signal field.

4. The apparatus of claim 1, wherein the field characteristics of the optical control input field are selected to produce the selective exchange corresponding to a unitary shift of the predetermined temporal mode of the optical signal input field to a carrier frequency of the intracavity optical register field so that the intracavity optical register field can be stored in the optical cavity or allowed to leak out of the optical cavity.

5. The apparatus of claim 1, wherein the field characteristics of the optical control input field are selected to produce the selective exchange corresponding to a unitary shift of the intracavity optical register field to the predetermined temporal mode at a carrier frequency of an optical signal output field that can be read out of the optical cavity.

6. The apparatus of claim 1, further comprising a pulse controller configured to produce the optical control input field with the selectable field characteristics.

7. The apparatus of claim 1, further comprising an input optical waveguide optically coupled to the optical cavity through the optical coupling portion and configured to propagate one or both of the optical signal input field and optical control input field; and
an output optical waveguide optically coupled to the optical cavity through the optical coupling portion and configured to propagate one or more of an optical signal output field, an optical control output field, and an optical register output field.

8. The apparatus of claim 7, wherein the input optical waveguide and the output optical waveguide form a single continuous waveguide.

9. The apparatus of claim 7, wherein the input optical waveguide is evanescently coupled to the optical cavity through the optical coupling portion to couple the one or both of the of the optical signal input field and optical control input field to the respective intracavity optical signal field and/or intracavity optical control field of the optical cavity;
wherein the output optical waveguide is evanescently coupled to the optical cavity through the optical coupling portion to couple one or more of the intracavity optical signal, control, and register fields out of the optical cavity.

10. The apparatus of claim 1, further comprising a signal input optical waveguide configured to propagate the optical signal input field and optically coupled to the optical cavity through a first surface of the optical coupling portion; and
a control input optical waveguide configured to propagate the optical control input field and optically coupled to the optical cavity through a second surface of the optical coupling portion spaced apart from the first surface.

11. The apparatus of claim 1, wherein the optical coupling portion includes one or more dichroic reflective surfaces configured to optically couple the optical signal input field and optical control input field to the optical cavity.

12. The apparatus of claim 11, wherein the one or more dichroic surfaces or another dichroic surface provides a cavity lifetime of the intracavity optical register field that is at least two orders of magnitude longer than a cavity lifetime of the intracavity optical signal field.

13. The apparatus of claim 1, wherein the mediated selective exchange corresponds to one of a second-order optical nonlinearity and a third-order optical nonlinearity.

14. The apparatus of claim 1, wherein the optical cavity comprises a ring resonator.

15. The apparatus of claim 14, wherein the optical cavity comprises a plurality of planar mirrors.

16. The apparatus of claim 1, wherein the optical cavity comprises a pair of opposing reflective elements configured to form a Fabry-Perot resonator.

17. The apparatus of claim 1, wherein the optical cavity corresponds to a first optical cavity and the optical signal input field corresponds to a qudit, wherein the apparatus further comprises:
a second optical cavity situated to receive the qudit as operated on by the first optical cavity and to target a predetermined temporal mode of the operated-on qudit with a second optical control input field coupled to the second optical cavity.

18. The apparatus of claim 1, further comprising a detector optically coupled to the optical cavity to detect the optical signal, control, or register fields, or a combination thereof.

19. A quantum pulse gate, comprising the apparatus of claim 1.

20. A method, comprising:
frequency shifting with a non-linear optical cavity a selected temporal mode component of a first field at a first frequency to a second field at a second frequency based on a time-dependence of a third field at a third frequency;
wherein a cavity lifetime of the second field is longer than a cavity lifetime of the first field;
wherein a rate of temporal variation of a first signal input associated with the first field is slower than the cavity lifetime of the first field.

21. An apparatus, comprising:
means for receiving a first optical field in an optical cavity; and
means for selectively converting a predetermined temporal mode component of the first optical field to a second optical field at a disjoint frequency in the optical cavity.

* * * * *